US008808529B2

(12) United States Patent
McAlister

(10) Patent No.: US 8,808,529 B2
(45) Date of Patent: Aug. 19, 2014

(54) SYSTEMS AND METHODS FOR SUSTAINABLE ECONOMIC DEVELOPMENT THROUGH INTEGRATED FULL SPECTRUM PRODUCTION OF RENEWABLE MATERIAL RESOURCES USING SOLAR THERMAL

(75) Inventor: Roy E. McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 12/857,554

(22) Filed: Aug. 16, 2010

(65) Prior Publication Data

US 2011/0070510 A1 Mar. 24, 2011

Related U.S. Application Data

(63) Continuation-in-part of application No. 12/707,651, filed on Feb. 17, 2010, now Pat. No. 8,075,748, which is a continuation-in-part of application No. PCT/US2010/024497, filed on Feb. 17, 2010, which is a continuation-in-part of application No. 12/707,653, filed on Feb. 17, 2010, now Pat. No. 8,172,990, application No. 12/857,554, which is a continuation-in-part of application No. 12/707,656, filed on Feb. 17, 2010, now Pat. No. 8,075,049, application No. 12/857,554, which is a (Continued)

(51) Int. Cl.
  *C25B 1/02* (2006.01)
  *C25B 3/00* (2006.01)

(52) U.S. Cl.
  USPC ............ 205/637; 205/413; 205/462; 205/551

(58) Field of Classification Search
  USPC .................................. 205/413, 462, 551, 637
  See application file for complete search history.

(56) References Cited

U.S. PATENT DOCUMENTS

| 2,208,157 A | 7/1940 | Fritz |
| 2,398,828 A | 4/1946 | Gray |

(Continued)

FOREIGN PATENT DOCUMENTS

| EP | 0485922 A1 | 5/1992 |
| EP | 2103682 | 9/2009 |

(Continued)

OTHER PUBLICATIONS

"Features." Accessed: Aug. 12, 2010. <http://www.pre.nl/simapro/simapro_lca_software.htm>. pp. 1-7.

(Continued)

*Primary Examiner* — Nicholas A Smith
(74) *Attorney, Agent, or Firm* — Perkins Coie LLP

(57) ABSTRACT

In one embodiment of the present invention, a system for providing a renewable source of material resources is provided comprising: a first source of renewable energy; first stream of materials from a first materials source; an electrolyzer coupled to the first source of renewable energy and the first stream of materials, wherein the electrolyzer is configured to produce a first material resource by electrolysis; a processor for further processing or use or the material resource to produce a second material resource, wherein the processor comprises a solar collector and where the solar collector is configured to provide heat to the first materials resource for disassociation; and a material resource storage coupled to the electrolyzer for receiving the material resource from the electrolyzer or providing the material resource to the processor for further processing or use.

19 Claims, 19 Drawing Sheets

Related U.S. Application Data continuation-in-part of application No. PCT/US2010/024499, filed on Feb. 17, 2010, application No. 12/857,554, which is a continuation-in-part of application No. PCT/US2010/024498, filed on Feb. 17, 2010.

(60) Provisional application No. 61/304,403, filed on Feb. 13, 2010, provisional application No. 61/153,253, filed on Feb. 17, 2009, provisional application No. 61/237,476, filed on Aug. 27, 2009, provisional application No. 61/304,403, filed on Feb. 13, 2010.

(56) References Cited

U.S. PATENT DOCUMENTS

| | | |
|---|---|---|
| 3,888,896 A | 6/1975 | Espino et al. |
| 4,105,755 A | 8/1978 | Darnell et al. |
| 4,124,481 A | 11/1978 | Ramer |
| 4,172,506 A | 10/1979 | Terry |
| 4,200,505 A | 4/1980 | Day et al. |
| 4,319,635 A | 3/1982 | Jones |
| 4,341,607 A | 7/1982 | Tison |
| 4,341,608 A | 7/1982 | St. John |
| 4,382,189 A | 5/1983 | Wilson |
| 4,386,801 A | 6/1983 | Chapman et al. |
| 4,389,288 A | 6/1983 | Vaughan |
| 4,395,316 A | 7/1983 | St. John |
| 4,437,954 A | 3/1984 | Sammells |
| 4,455,045 A | 6/1984 | Wheeler |
| 4,468,235 A | 8/1984 | Hill |
| 4,601,508 A | 7/1986 | Kerian |
| 4,611,847 A | 9/1986 | Sullivan |
| 4,736,111 A | 4/1988 | Linden |
| 4,746,160 A | 5/1988 | Wiesemeyer |
| 4,896,507 A | 1/1990 | Hosford |
| 4,902,307 A | 2/1990 | Gavalas et al. |
| 4,978,162 A | 12/1990 | Labbe |
| 4,985,055 A | 1/1991 | Thorne et al. |
| 5,024,818 A | 6/1991 | Tibbetts et al. |
| 5,058,945 A | 10/1991 | Elliott, Sr. et al. |
| 5,119,897 A | 6/1992 | Moriwake |
| 5,132,007 A * | 7/1992 | Meyer et al. ................ 208/427 |
| 5,222,698 A | 6/1993 | Nelson et al. |
| 5,259,870 A | 11/1993 | Edlund |
| 5,280,990 A | 1/1994 | Rinard |
| 5,323,061 A | 6/1994 | Immler et al. |
| 5,343,699 A | 9/1994 | McAlister |
| 5,407,245 A | 4/1995 | Geropp |
| 5,498,059 A | 3/1996 | Switlik |
| 5,560,443 A | 10/1996 | DuBose |
| 5,617,504 A | 4/1997 | Sciacca et al. |
| 5,662,389 A | 9/1997 | Truglio et al. |
| 5,719,990 A | 2/1998 | Yang |
| 5,806,553 A | 9/1998 | Sidwell |
| 5,986,429 A | 11/1999 | Mula, Jr. |
| 6,015,065 A | 1/2000 | McAlister |
| 6,068,328 A | 5/2000 | Gazdzinski |
| 6,081,183 A | 6/2000 | Mading et al. |
| 6,083,377 A * | 7/2000 | Lin et al. .................... 205/617 |
| 6,090,266 A | 7/2000 | Roychowdhury |
| 6,092,861 A | 7/2000 | Whelan |
| 6,155,212 A | 12/2000 | McAlister |
| 6,200,069 B1 | 3/2001 | Miller |
| 6,216,599 B1 | 4/2001 | Cavanagh |
| 6,220,193 B1 | 4/2001 | Dilks |
| 6,309,010 B1 | 10/2001 | Whitten |
| 6,378,932 B1 | 4/2002 | Fasel et al. |
| 6,402,810 B1 | 6/2002 | Mayer et al. |
| 6,409,252 B1 | 6/2002 | Andrus |
| 6,446,597 B1 | 9/2002 | McAlister |
| 6,468,684 B1 | 10/2002 | Chisholm et al. |
| 6,500,313 B2 | 12/2002 | Sherwood |
| 6,502,533 B1 | 1/2003 | Meacham |
| 6,503,584 B1 | 1/2003 | McAlister |
| 6,516,754 B2 | 2/2003 | Chadwick |
| 6,525,431 B1 | 2/2003 | Clucas et al. |
| 6,606,860 B2 | 8/2003 | McFarland |
| 6,749,043 B2 | 6/2004 | Brown et al. |
| 6,755,899 B2 | 6/2004 | Nagai |
| 6,756,140 B1 | 6/2004 | McAlister |
| 6,757,591 B2 | 6/2004 | Kramer |
| 6,784,562 B2 | 8/2004 | Gennesseaux |
| 6,838,782 B2 | 1/2005 | Vu |
| 6,854,788 B1 | 2/2005 | Graham |
| 6,897,575 B1 | 5/2005 | Yu |
| 6,926,345 B2 | 8/2005 | Ortega et al. |
| 6,979,049 B2 | 12/2005 | Ortega et al. |
| 6,984,305 B2 | 1/2006 | McAlister |
| 7,062,913 B2 | 6/2006 | Christensen et al. |
| 7,152,908 B2 | 12/2006 | Shahbazi |
| 7,165,804 B2 | 1/2007 | Shahbazi |
| 7,185,944 B2 | 3/2007 | Shahbazi |
| 7,207,620 B2 | 4/2007 | Cosgrove et al. |
| 7,210,467 B2 | 5/2007 | Kweon et al. |
| 7,211,905 B1 | 5/2007 | McDavid, Jr. |
| 7,237,827 B2 | 7/2007 | Shahbazi |
| 7,243,980 B2 | 7/2007 | Vala |
| 7,254,944 B1 | 8/2007 | Goetzinger et al. |
| 7,427,189 B2 | 9/2008 | Eyb |
| 7,592,383 B2 | 9/2009 | Fukui |
| 7,632,338 B2 | 12/2009 | Cipollini |
| 7,827,974 B2 | 11/2010 | Beckmann |
| 7,931,784 B2 | 4/2011 | Medoff |
| 8,165,968 B2 | 4/2012 | Ramesh et al. |
| 8,187,549 B2 | 5/2012 | McAlister |
| 8,187,550 B2 | 5/2012 | McAlister |
| 8,313,556 B2 | 11/2012 | McAlister |
| 2001/0035093 A1 | 11/2001 | Yokota |
| 2002/0007845 A1 | 1/2002 | Collette et al. |
| 2003/0012985 A1 | 1/2003 | McAlister |
| 2003/0039608 A1 | 2/2003 | Shah et al. |
| 2003/0062270 A1 | 4/2003 | McAlister |
| 2004/0089439 A1 | 5/2004 | Treverton et al. |
| 2004/0124095 A1 | 7/2004 | Fujimura et al. |
| 2004/0126632 A1 * | 7/2004 | Pearson et al. .................. 429/17 |
| 2005/0003247 A1 * | 1/2005 | Pham ............................. 429/17 |
| 2005/0048334 A1 | 3/2005 | Sridhar et al. |
| 2005/0109394 A1 | 5/2005 | Anderson |
| 2006/0005738 A1 | 1/2006 | Kumar |
| 2006/0005739 A1 | 1/2006 | Kumar |
| 2006/0048770 A1 | 3/2006 | Meksvanh et al. |
| 2006/0049063 A1 | 3/2006 | Murphy et al. |
| 2006/0162554 A1 | 7/2006 | Kelley |
| 2006/0257310 A1 | 11/2006 | Tada et al. |
| 2007/0138006 A1 | 6/2007 | Oakes et al. |
| 2007/0220887 A1 | 9/2007 | Monostory et al. |
| 2008/0050800 A1 | 2/2008 | McKeeman et al. |
| 2008/0078675 A1 | 4/2008 | Kawahara et al. |
| 2008/0088135 A1 | 4/2008 | Novo Vidal |
| 2008/0102329 A1 | 5/2008 | Hollinger |
| 2008/0115415 A1 | 5/2008 | Agrawal et al. |
| 2008/0138675 A1 * | 6/2008 | Jang et al. ...................... 429/17 |
| 2008/0245672 A1 | 10/2008 | Little et al. |
| 2008/0303348 A1 | 12/2008 | Witters |
| 2008/0318092 A1 * | 12/2008 | Sridhar et al. .................. 429/13 |
| 2009/0016948 A1 | 1/2009 | Young |
| 2009/0169452 A1 | 7/2009 | Constantz et al. |
| 2009/0217584 A1 | 9/2009 | Raman et al. |
| 2009/0235587 A1 * | 9/2009 | Hawkes et al. .................. 48/202 |
| 2009/0263540 A1 | 10/2009 | Allen et al. |
| 2009/0266075 A1 | 10/2009 | Westmeier et al. |
| 2009/0276265 A1 | 11/2009 | Ahmed et al. |
| 2010/0101231 A1 | 4/2010 | Westmeier |
| 2010/0107994 A1 | 5/2010 | Moriarty et al. |
| 2011/0041784 A1 | 2/2011 | McAlister |
| 2011/0061295 A1 | 3/2011 | McAlister |
| 2011/0081586 A1 | 4/2011 | McAlister |
| 2011/0198211 A1 | 8/2011 | McAlister |

(56) References Cited

U.S. PATENT DOCUMENTS

2011/0200897 A1 8/2011 McAlister
2011/0230573 A1 9/2011 McAlister

FOREIGN PATENT DOCUMENTS

| GB | 2 248 230 A | 1/1992 |
|---|---|---|
| JP | 04-076211 | 3/1992 |
| JP | 04-357969 A | 12/1992 |
| JP | 05-223268 | 8/1993 |
| JP | 07-113567 | 5/1995 |
| JP | 2000-205044 | 7/2000 |
| JP | 2000-297700 | 10/2000 |
| JP | 2002-119822 A | 4/2002 |
| JP | 2006-128006 | 5/2006 |
| KR | 10-0808736 | 2/2008 |
| KR | 10-090119098 | 11/2009 |
| WO | WO-01-56938 | 8/2001 |
| WO | WO-2006-136860 | 12/2006 |
| WO | WO-2008-115933 | 9/2008 |

OTHER PUBLICATIONS

"GaBi Software: Results and Interpretation." Accessed: Aug. 12, 2010. <http://www.gabi-software.com/software/gabi-4/results-and-interpretation/>. p. 1.

California Clean Air Conversions, LLC. Advanced Green Innovations, LLC. "Meeting California's 2010 Vision: Renewable Hydrogen Production and Fleet Conversion" 2010. p. 1.

Fernando, Vincent. "Exxon: Here's Why We Just Spent $41 Billlion on Natural Gas." Business Insider. Published: Dec. 14, 2009. Web. <http://www.businessinsider.com/exxon-heres-why-we-just-spent-41-billion-on-natural-gas-2009-12>. pp. 1-8.

Holdren, John P. "Meeting the Climate-Change Challenge." Lecture Slides. The John H. Chafee Memorial Lecture. Washington DC. Jan. 17, 2008. pp. 1-52.

International Maritime Organization. "Prevention of Air Pollution from Ships." Marine Environment Protection Committee. 59th Session, Agenda Item 4. Apr. 9, 2009. pp. 1-289.

International Search Report and Written Opinion for Application No. PCT/US2010/002260; Applicant: McAlister Technologies, LLC.; Date of Mailing: Apr. 28, 2011. pp. 1-8.

International Search Report and Written Opinion for Application No. PCT/US2010/045664; Applicant: McAlister Technologies, LLC.; Date of Mailing: Apr. 15, 2011. pp. 1-8.

International Search Report and Written Opinion for Application No. PCT/US2010/045674; Applicant: McAlister Technologies, LLC.; Date of Mailing: Apr. 29, 2011. pp. 1-9.

McAlister, Roy. "Maximizing Renewable Energy Efficiencies: A Full Spectrum Approach." Feb. 2009. pp. 1-21.

McAlister, Roy. "Sustainable Hydrogen Hyway." California Clean Air Conversions, LLC. Advanced Green Innovations, LLC. 2010. pp. 1-6.

Murray, Don. "World Energy Park." Starpoint Solar. Presentation. Accessed: Jun. 4, 2009. pp. 1-33.

First Action Interview Office Action for U.S. Appl. No. 13/027,235; Applicant: McAlister Technologies, LLC.; Date of Mailing: Oct. 20, 2011. pp. 1-4.

Non-Final Office Action for U.S. Appl. No. 12/857,554; Applicant: McAlister Technologies, LLC.; Date of Mailing: Nov. 21, 2011. pp. 1-30.

International Search Report and Written Opinion for Application No. PCT/US11/024813; Applicant: McAlister Technologies, LLC; Date of Mailing: Nov. 30, 2011. pp. 1-12.

Zhang et al., "Economic Modelling Approaches to Cost Estimates for the Control of Carbon Dioxide Emissions," Energy Economics, 1998, vol. 20, pp. 101-120.

* cited by examiner

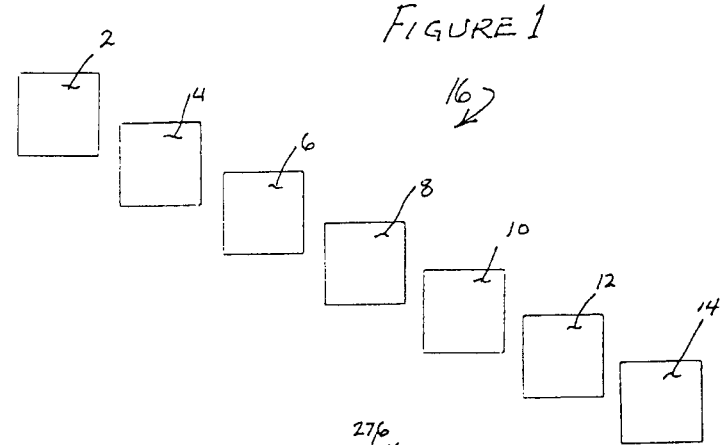
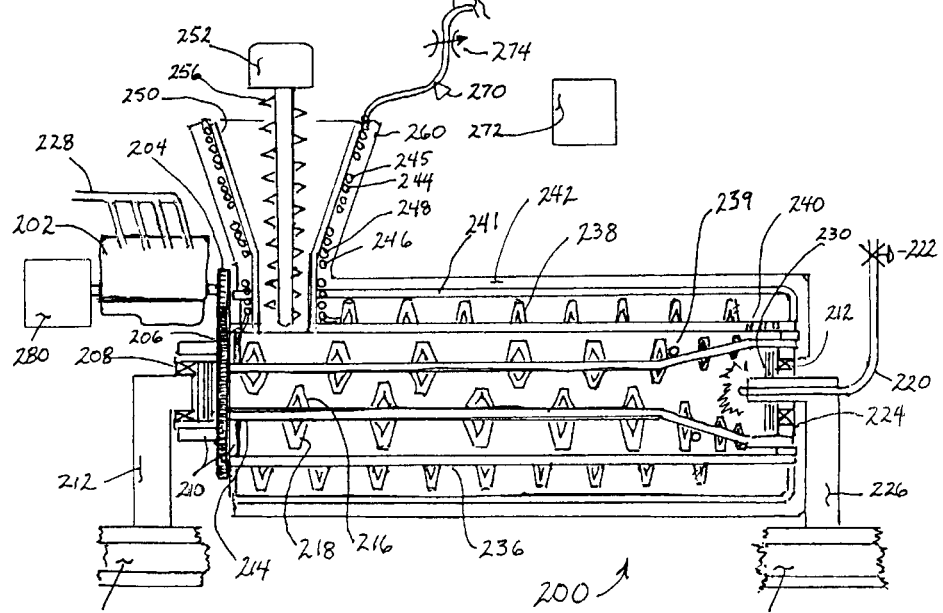

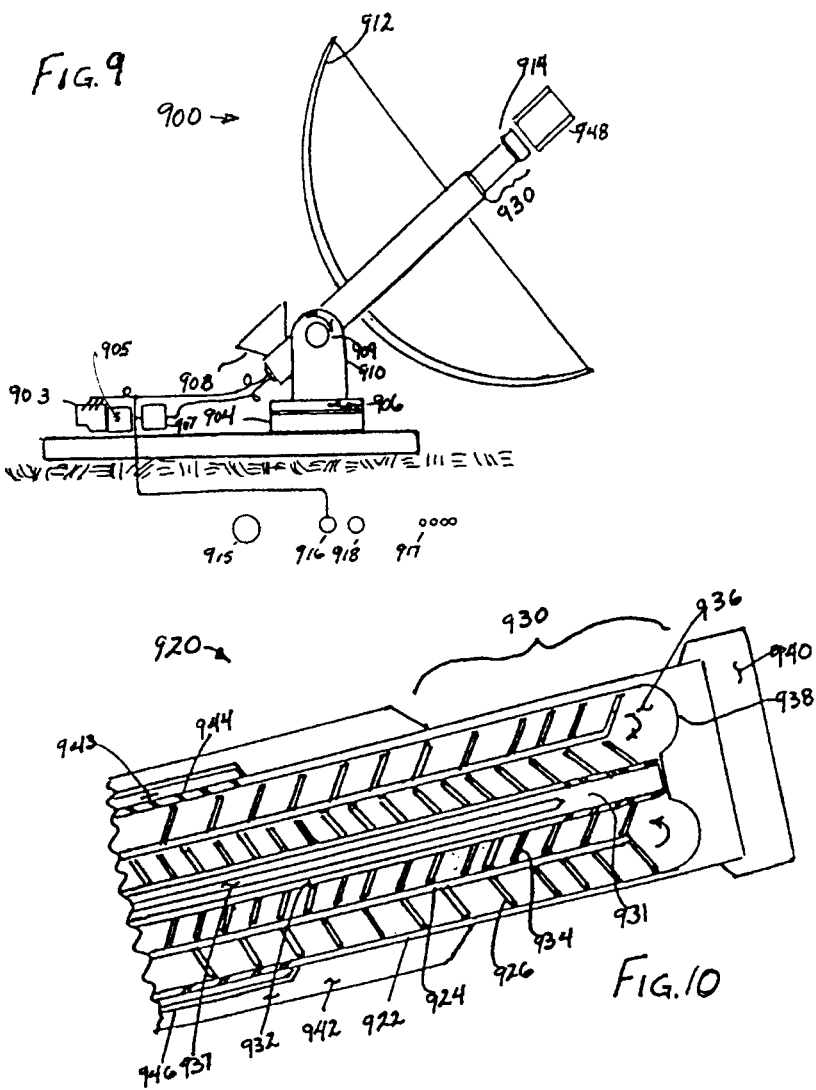

SYSTEMS AND METHODS FOR SUSTAINABLE ECONOMIC DEVELOPMENT THROUGH INTEGRATED FULL SPECTRUM PRODUCTION OF RENEWABLE MATERIAL RESOURCES USING SOLAR THERMAL

CROSS REFERENCE TO RELATED APPLICATIONS

The present application claims priority to and the benefit of U.S. Provisional Application No. 61/304,403, filed Feb. 13, 2010 and titled FULL SPECTRUM ENERGY AND RESOURCE INDEPENDENCE. The present application is a continuation-in-part of each of the following applications: U.S. patent application Ser. No. 12/707,651, filed Feb. 17, 2010, now U.S. Pat. No. 8,075,748 and titled ELECTROLYTIC CELL AND METHOD OF USE THEREOF; PCT Application No. PCT/US 10/24497, filed Feb. 17, 2010 and titled ELECTROLYTIC CELL AND METHOD OF USE THEREOF; U.S. patent application Ser. No. 12/707,653, filed Feb. 17, 2010, now U.S. Pat. No. 8,172,990 and titled APPARATUS AND METHOD FOR CONTROLLING NUCLEATION DURING ELECTROLYSIS; PCT Application No. PCT/US 10/24498, filed Feb. 17, 2010 and titled APPARATUS AND METHOD FOR CONTROLLING NUCLEATION DURING ELECTROLYSIS; U.S. patent application Ser. No. 12/707,656, filed Feb. 17, 2010, now U.S. Pat. No. 8,075,749 and titled APPARATUS AND METHOD FOR GAS CAPTURE DURING ELECTROLYSIS; and PCT Application No. PCT/US 10/24499, filed Feb. 17, 2010 and titled APPARATUS AND METHOD FOR CONTROLLING NUCLEATION DURING ELECTROLYSIS; each of which claims priority to and the benefit of the following applications: U.S. Provisional Patent Application No. 61/153,253, filed Feb. 17, 2009 and titled FULL SPECTRUM ENERGY; U.S. Provisional Patent Application No. 61/237,476, filed Aug. 27, 2009 and titled ELECTROLYZER AND ENERGY INDEPENDENCE TECHNOLOGIES; U.S. Provisional Application No. 61/304,403, filed Feb. 13, 2010 and titled FULL SPECTRUM ENERGY AND RESOURCE INDEPENDENCE. Each of these applications is incorporated by reference in its entirety.

BACKGROUND

Aquatic plants and vegetative groundcover, particularly farms and forests are essential carbon dioxide collectors, natural habitats for countless wildlife, and sources of fiber for applications ranging from paper products to building materials. Devastation of forests on almost all continents has occurred because of non-native pest introductions and greenhouse gas exacerbated climatic changes that have made forests vulnerable to pestilence, fire, wind, flood, and drought damages.

Throughout South, Central, and North America forest fires have destroyed vast stands of trees that have been weakened or killed by drought and disease. This represents an enormous loss of pulp and building materials. Fires and rot also produce greenhouse gases such as carbon dioxide and methane that further harm the global atmosphere. It is of paramount importance to provide practical solutions that enable rapid conversion of vegetative biomass into renewable supplies of fuels, electricity, and valuable materials before these materials are lost because of fires, decay, floods and erosion. A corollary objective is to facilitate rapid redevelopment of healthy forests, crops, and other groundcover and to facilitate production of fuel and sequestered carbon values from prescribed thinning and underbrush removal to improve forest conditions and to prevent the spread of harmful fires.

Increased demand has developed for hydrogen, oxygen, methane, carbon and other products that can be provided by thermochemistry and/or electrolytic dissociation of feedstocks such as biomass wastes. Past efforts to dissociate biomass by thermochemical methods began in earnest with William Murdock's production in 1792 of hydrogen by the reaction of steam with carbon donors such as peat, coal, and charcoal. More recently, steam reforming has been widely utilized by the petroleum industry to produce hydrogen from oil, natural gas, and other fossil feedstocks.

Carbon dioxide and methane releases into the global atmosphere cause climate changes that threaten extermination of up to ⅓ of all living species. Efforts to overcome greenhouse gas degradation of the atmosphere are noted in "*Greenhouse Gas Carbon Dioxide Mitigation: Science and Technology*" by Martin M. Halmann and Meyer Steinberg and in "*Recent Advances in Environmental Economics*" by John A. List and in "*Greenhouse Gas Control Technologies: Proceedings of the 6$^{th}$ International Conference on Greenhouse Gas Control Technologies*" by John Gale.

Alternate approaches to methane and hydrogen manufacture have been through destructive distillation and anaerobic pyrolysis. Others have utilized falling water, wind, solar, and fossil energy sources to produce electricity that is applied to split water by electrolysis. Victoria M. Laube and Stanley Martin describe the use of microorganisms to gasify cellulose in "*Conversion of Cellulose to Methane and Carbon Dioxide by Triculture of Acetivibrio Cellulolyticus Desulfovibro sp., and Methanocarcina Barkeri*" (National Research Council of Canada). It is also well known that symbiotic relationships exist between larger species such as bovine animals and termites that consume lignocellulose and produce methane and carbon dioxide as a result of hosting such methane producing microorganisms in their digestive systems.

Efforts to provide technology for reducing problems encountered by these approaches are noted in publications such as "*Hydrogen Production From Water By Means of Chemical Cycles*", by Glandt, Eduardo D., and Myers, Allan L., Department of Chemical and Biochemical Engineering, University of Pennsylvania, Philadelphia, Pa. 19174; *Industrial Engineering Chemical Process Development*, Vol. 15, No. 1, 1976; "*Hydrogen As A Future Fuel*" by Gregory, D. P., Institute of Gas Technology.

Problems with such systems include low energy-conversion efficiency and unacceptably high costs for capital equipment and infrastructure improvements, difficulties with scale up to tackle significant problems such as forest conversion, and high operating costs. In addition prior art approaches entail very large releases of carbon dioxide. Compressors required to pressurize hydrogen and/or methane and other products in such processes require sizeable capital expenditures, large expenditures for electricity and attendant production of greenhouse gases, and high operating costs. Further, unacceptable maintenance requirements and high repair expenses have defeated such approaches. Prior art waste-to-energy technologies provide severely limited capabilities if not counterproductive results for overcoming the growing problem of climate changes due to greenhouse gas accumulations in the global atmosphere. In summary, prior art technologies are too expensive, too wasteful, and too polluting.

It is therefore an object of some embodiments of the present invention to provide systems and methods for sustainable economic development through integrated full spectrum production of renewable nutrient resources, which can include the use of an electrochemical or electrolytic cell, and a method of use thereof, for separated production of nutrient resources to address one or more of the problems set forth above.

SUMMARY

In one embodiment of the present invention, a system for providing a renewable source of material resources is provided comprising: a first source of renewable energy; first stream of materials from a first materials source; an electrolyzer coupled to the first source of renewable energy and the first stream of materials, wherein the electrolyzer is configured to produce a first material resource by electrolysis; a processor for further processing or use or the material resource to produce a second material resource, wherein the processor comprises a solar collector and where the solar collector is configured to provide heat to the first materials resource for disassociation; and a material resource storage coupled to the electrolyzer for receiving the material resource from the electrolyzer or providing the material resource to the processor for further processing or use.

In another embodiment, a system for providing a renewable source of material resources comprising: a first source of renewable energy; first stream of materials from a first materials source; an electrolyzer coupled to the first source of renewable energy and the first stream of materials, wherein the electrolyzer is configured to produce a first material resource by electrolysis; a processor for further processing or use or the material resource to produce a second material resource, wherein the processor comprises a solar collector and where the solar collector is configured to provide heat to the first materials resource for disassociation; and a material resource storage coupled to the electrolyzer for receiving the material resource from the electrolyzer or providing the material resource to the processor for further processing or use.

In yet another embodiment, a method for providing a renewable source of a material resource comprising: providing a first source of renewable energy; providing a first stream of materials from a first materials source; providing an electrolyzer coupled to the first stream of materials and the first source of renewable energy, wherein the electrolyzer produces a material resource from the first stream of materials through electrolysis, and providing the material resource to a first processor for further processing or use.

Other features and advantages of the present invention will become apparent from the following detailed description. It should be understood, however, that the detailed description and the specific examples, while indicating the preferred embodiments of the present invention, are given by way of illustration only, since various changes and modifications within the spirit and scope of the present invention will become apparent to those skilled in the art from this detailed description.

BRIEF DESCRIPTION OF THE FIGURES

FIG. 1 depicts process steps of the invention.

FIG. 2 is a longitudinal sectional view of an embodiment that operates in accordance with the principles of the present invention.

FIG. 9 depicts components that operate in accordance with the principles of the invention.

FIG. 10 is a schematic of embodiments of the invention.

DETAILED DESCRIPTION

Figure 1B:
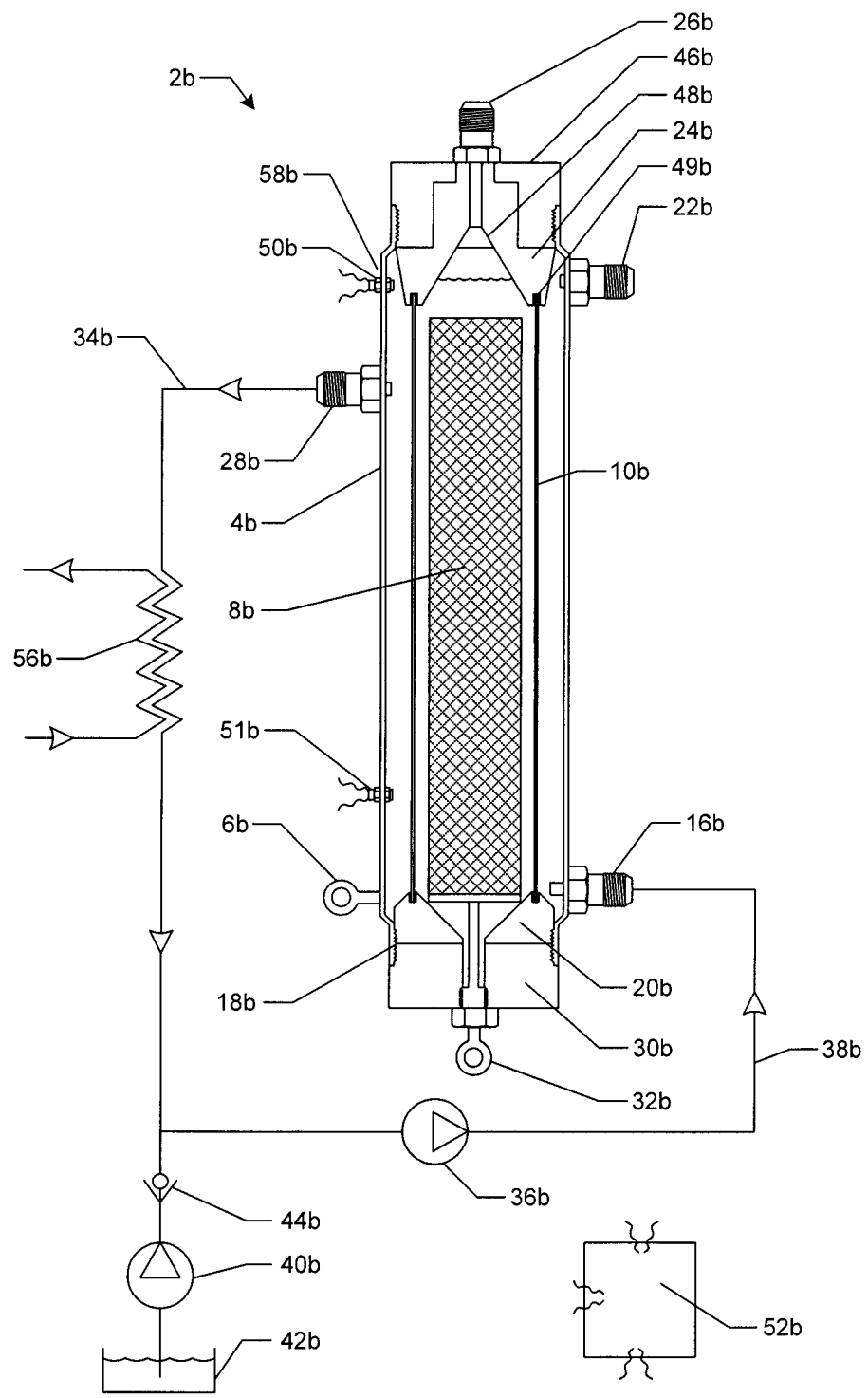
FIG. 1B shows an electrolytic cell in accordance with an embodiment of the present invention.

The present application incorporates by reference in its entirety the subject matter of U.S. Provisional Patent Application No. 60/626,021, filed Nov. 9, 2004 and titled MULTI-FUEL STORAGE, METERING AND IGNITION SYSTEM. The present application incorporates by reference in their entirety the subject matter of each of the following U.S. Patent Applications, filed concurrently herewith on Aug. 16, 2010 and titled: METHODS AND APPARATUSES FOR DETECTION OF PROPERTIES OF FLUID CONVEYANCE SYSTEMS (U.S. application Ser. No. 12/806,634); COMPREHENSIVE COST MODELING OF AUTOGENOUS SYSTEMS AND PROCESSES FOR THE PRODUCTION OF ENERGY, MATERIAL RESOURCES AND NUTRIENT REGIMES (U.S. Application No. 61/401,699); ELECTROLYTIC CELL AND METHOD OF USE THEREOF (U.S. application Ser. No. 12/806,633); SUSTAINABLE ECONOMIC DEVELOPMENT THROUGH INTEGRATED PRODUCTION OF RENEWABLE ENERGY, MATERIALS RESOURCES, AND NUTRIENT REGIMES (U.S. application Ser. No. 12/857,553); SYSTEMS AND METHODS FOR SUSTAINABLE ECONOMIC DEVELOPMENT THROUGH INTEGRATED FULL SPECTRUM PRODUCTION OF RENEWABLE ENERGY (U.S. application Ser. No. 12/857,541); METHOD AND SYSTEM FOR INCREASING THE EFFICIENCY OF SUPPLEMENTED OCEAN THERMAL ENERGY CONVERSION (SOTEC) (U.S. application Ser. No. 12/857,546); GAS HYDRATE CONVERSION SYSTEM FOR HARVESTING HYDROCARBON HYDRATE DEPOSITS (U.S. U.S. application Ser. No. 12/857,228); APPARATUSES AND METHODS FOR STORING AND/OR FILTERING A SUBSTANCE (U.S. application Ser. No. 12/857,515); ENERGY SYSTEM FOR DWELLING SUPPORT (U.S. application Ser. No. 12/857,502); ENERGY CONVERSION ASSEMBLIES AND ASSOCIATED METHODS OF USE AND MANUFACTURE (U.S. U.S. application Ser. No. 12/857,433); and INTERNALLY REINFORCED STRUCTURAL COMPOSITES AND ASSOCIATED METHODS OF MANUFACTURING (U.S. application Ser. No. 12/857,461).

In order to fully understand the manner in which the above-recited details and other advantages and objects according to the invention are obtained, a more detailed description of the invention will be rendered by reference to specific embodiments thereof.

FIG. 1 shows a process 16 in which biomass including municipal, farm, and forest wastes such as forest slash and diseased and/or dead trees are cut, pulled, or otherwise harvested and delivered at step 2. In step 4 such biomass wastes are chipped or otherwise subdivided into bits and pieces for the purpose of efficient transport and compaction by a conveyer such as a belt, ram, or screw conveyer. In step 6 subdivided biomass wastes are dried and converted by regenerative dissociation to produce hydrocarbons, alcohol vapors along with methane, hydrogen, and other gases along with solids such as carbon and minerals that are introduced by or along with the cellulose and/or lignocellulosic feedstocks. Step 8 provides for separation of vapors and gases such as methane and or hydrogen from carbon dioxide. Step 10 provides for shipment of typically methane-rich gases by pipelines or other transport methods such as those utilized by the natural gas industry. Step 12 provides for production of hydrogen and carbon products from such pipeline deliveries of methane-rich gases. Step 14 provides use of hydrogen in engines and/or fuel cells to power motor vehicles, to provide heat, for shaft work and electricity generation, for chemical process applications, and to produce fertilizers.

Analysis of fire, earthquake and mudslide hazards in most damaged forest settings show that it is highly advantageous to facilitate the solution presently disclosed by establishing underground pipelines to transport methane produced by rapid harvest and conversion of such damaged forests and/or groundcover. Pipeline shipment of such renewable methane to markets now served by natural gas or other fossil fuels provides dramatic reductions in environmental impact from greenhouse gases and it facilitates evolution from present dependence upon fossil energy to renewable energy security.

Job development and investor confidence is bolstered by establishment of renewable sources of methane that can be delivered by low cost transport through pipelines. Further improvement is provided by development of the "carbon age" that is facilitated by conversion of methane to carbon products as hydrogen is used for clean energy applications.

FIG. 2 shows embodiment 200 of method and apparatus for regeneratively producing methane and/or hydrogen by dissociation of biomass in which subdivided materials such as various cellulosic materials and lignocellulosic tissues are de-aired, dried, and heated to release the desired gases as shown. The system of FIG. 2 provides important improvements in thermal efficiency and depression of carbon dioxide formation. These improvements are provided by countercurrent drying and elimination of air, moisture, and other oxygen donors prior to extraction of carbon, hydrocarbons such as methane, and/or hydrogen as designated in the process train shown in FIG. 1.

Ultimately such wastes are heated sufficiently in an anaerobic environment to release desirable gases, carbon, and solid residues such as mineral oxides and other compounds. The process is summarized by Equation 1, which is not balanced for any particular type, amount, or ratio of lignin, cellulose, or other biomass feedstock. Therefore, Equations 1 and 2 generalize the versatility of the process shown in FIG. 1 and illustrate the qualitative conversion of organic feedstocks that contain carbon, hydrogen, and oxygen into valuable supplies of methane, hydrogen, and sequestered carbon.

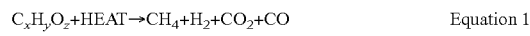

$$C_xH_yO_z + HEAT \rightarrow CH_4 + H_2 + CO_2 + CO \qquad \text{Equation 1}$$

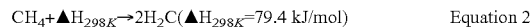

$$CH_4 + \Delta H_{298K} \rightarrow 2H_2C (\Delta H_{298K} = 79.4 \text{ kJ/mol}) \qquad \text{Equation 2}$$

Shown in FIG. 2 is a system embodiment for rapid conversion of biomass wastes into gases such as methane, hydrogen, carbon dioxide and carbon monoxide. In operation, rotating tube 214 is driven by suitable speed reduction system 204 and 206 by engine 202 which may be a rotary, piston, or turbine engine depending upon the size of the system and throughput desired. Engine 202 is preferably fueled by the fuel conditioning, injection, and ignition system 220 as disclosed in the U.S. patent application Ser. No. 08/785,376, which is incorporated herein. Waste heat from the engine cooling system and/or exhaust gases is preferably transferred to materials in hopper 250 by countercurrent turns of helical heat exchange tubing 244 and 245 that are joined to hopper 250 at respective zones that derive the maximum amount of heat recovery from engine 202.

Depending upon the size of converter, speed reduction components such as sprockets and chain or drive gear 206 and bearing support assembly 208 and 212 are preferably thermally isolated from rotating tube 214 by a torque-conveying thermal insulator 210. Rotating tube 214 is supported similarly and thermally isolated at the opposite end by insulated bearing and support assembly 224 and 226 as shown. Insulator pack 230 provides insulation to prevent radiative and conductive heat gain by bearing 212 and other areas where protection from heat is desired.

A relatively small portion of the methane and/or hydrogen and/or carbon monoxide generated as summarized by Equations 1 and 2 is delivered to engine 202 and to the burner nozzle of combustor assembly 220 through control valve 222 as shown in FIG. 2. Sufficient air is provided to assure complete combustion of fuel values that are present with minimal objectionable emissions in both applications. Hot products of combustion are circulated past spiral heat exchange tubing 216 for the purpose of transferring heat to organic materials that travel in counterflow direction by extrusion action of fins 218 on the exterior of rotating tube 214 as shown.

It is preferred to provide progressively reduced pitch of helical flights 218 and/or to reduce the cross-sectional area between rotating tube 214 and stationery tube 236 for the purpose of constantly compacting solid materials that are entrained within, as shown. This provides for expulsion of entrapped air and/or moisture from organic material being heated by the process as such gases are forced to travel in counterflow direction to material being ingested through heated hopper 250 and feed screw 256 which is driven by suitable traction motor 252 or a suitable drive train from engine 202. Decreasing the pitch of the screw conveyer or reducing the cross section through which compacted wastes travel further provides for a compact seal against the escape of gases produced by further heating of the organic materials including reactions with additions of reactive gases.

It is contemplated that the overall process of the invention will also be achieved by other material conveyance and compaction means and will be facilitated in some applications by a unidirectional ram delivery and compaction system instead of by the helical conveyer shown. The essential steps being accomplished by compaction and heat addition to eliminate air and moisture, creating a plug seal of advancing material derived from the feedstock, heating the advancing material to achieve the desired pressure and temperature conditions for dissociation to produce the desired chemical derivatives selected from substance options such as carbon, one or more vaporous hydrocarbons, fuel alcohols, and gases such as ethane, methane, hydrogen, and oxides of carbon, extraction of the desired chemical species in a zone that utilizes derivatives and/or remnants of the advancing material to seal or help seal the zone that provides for removal of desired chemical species. It is preferred to provide heat additions to material advancing through such stages of progress by countercurrent heat exchanges from the desired chemical species as it is recuperatively or regeneratively cooled and by countercurrent heat exchanges from combustion of selected fuels for the purpose of maximizing heat utilization in the resulting system.

Relatively extended operation can be provided with greatly reduced carbon production as may be preferred for purposes of achieving desired carbon to hydrogen ratios of the chemical species produced. This extended operation can be provided on an intermittent basis, such as between times that carbon is intentionally produced to aid in sealing the zone before collection of desired chemical species and/or the zone after such collection. This is a feature of some embodiments of the invention and it enables carbon to be transported as a constituent of fluids that are delivered by pipeline to storage including repressurization of depleted natural gas reservoirs, to industrial plants for making carbon-enhanced durable goods, and for other purposes. After successive expulsion of air and moisture biomass material is converted to the product gases shown in Equation 1 and a much lower volume of solid residues. In many instances the amount of solid residue is about 2 to 10% of the original mass of organic waste. Such residues are important sources of trace minerals that are preferably utilized to revitalize soils and assure rapid growth of replacement stands of healthy forests, gardens, aquaculture, and/or other groundcover. This expedites greenhouse gas reduction, sequestration of carbon and hydrogen, and economic development. Reforested areas serve as sustainable sources of lignocelluloses for continued production of renewable methane, hydrogen and sequestered carbon as disclosed herein.

In larger units and high through-put versions of the system, combustion gases from burner assembly 220 may be circulated within tubular flights 216 which are constructed to connect through holes in tube 214 with helical flight tubes 218 to provide for more rapid transfer of heat from combustor 220 to feedstock materials progressing along the outside of flights 218 within containment tube 236. Gases such as methane, hydrogen and carbon dioxide that are released from heated organic feedstocks by the thermal dissociation process are allowed to pass into annular space between helical fins 238 and insulated tube 241 to flow in countercurrent direction to the flow of feedstock being heated by rotating tube assembly 214. This provides for further heat conservation as heat is regeneratively added to feedstocks within tube 236 that are progressively compacted and dissociated by heat transfer to enhance pressure production as shown.

Combustion gases such as water vapor, nitrogen, oxygen, and carbon dioxide reaching the hopper area by travel through the interior of tube 214 and/or tubular fins 216 and/or 218 enter helical heat transfer tubing 246 to provide further countercurrent energy addition to feedstock materials progressing through hopper 250 as shown. Gases that are produced such as methane, hydrogen and carbon dioxide and/or carbon monoxide reaching the area of hopper 250 by passage through holes 230 and the annular area between tube 236 and tube 241 and/or hollow fin 238 are circulated through tubing 248 which is wound adjacent to helical tubing 246 for efficient countercurrent heat transfer to materials progressing to rotating tubular screw conveyer 214 as shown. Insulation 242 and 260 prevent heat loss to the outside.

Figure 4:
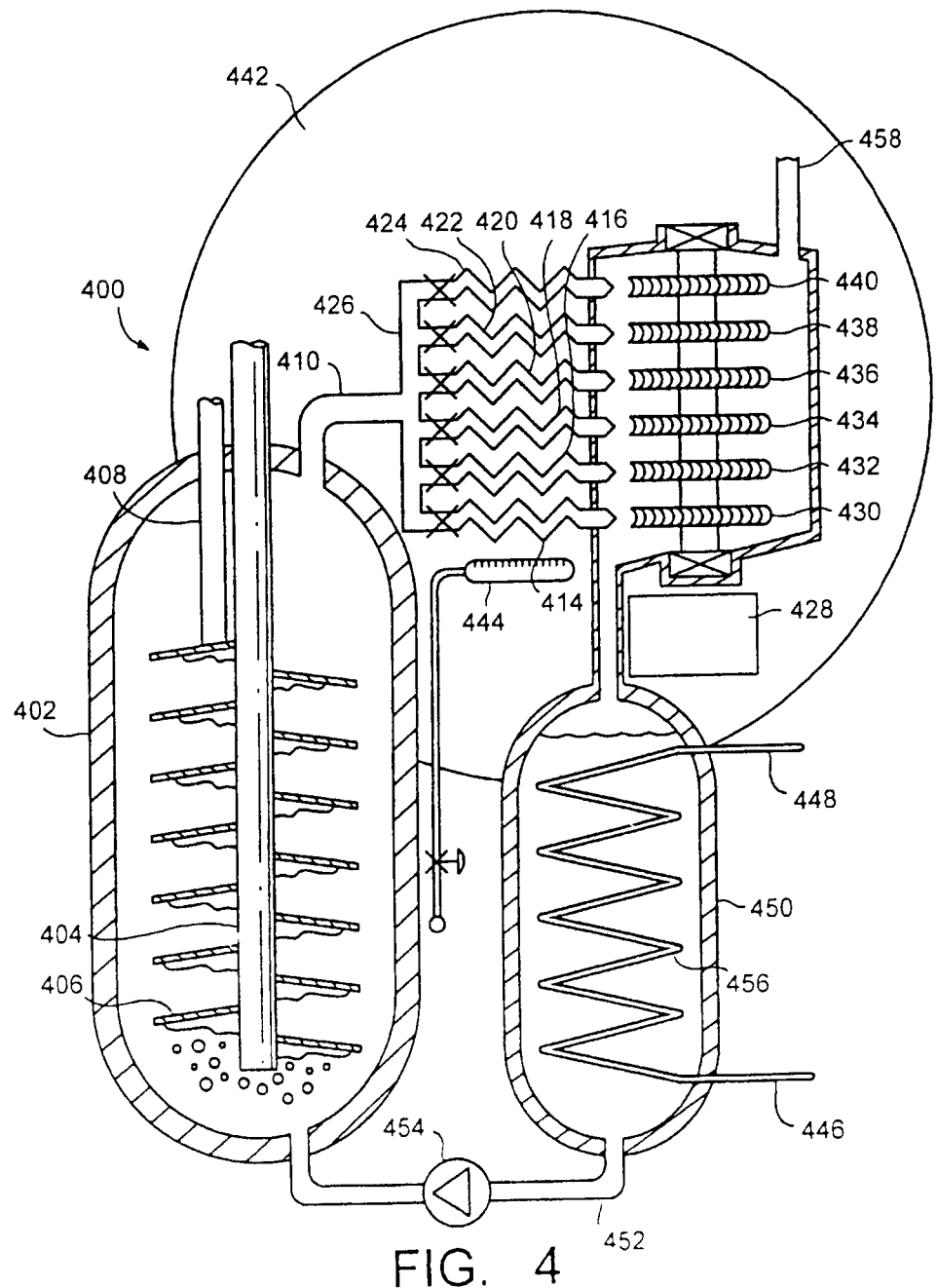
FIG. 4 is a sectional view of an embodiment that operates in accordance with the principles of the invention.

Mixtures of product gases such as carbon dioxide and carbon monoxide that may be produced are separated from methane and/or hydrogen by pressure swing or temperature absorption and/or the system shown in FIG. 4. Such mixtures of product gases are provided at a suitable margin above the desired pressure by controlling the speed of rotation of rotary conveyer 214 and thus the compaction of solids that are delivered to the thermal dissociation stage.

This provides efficient conversion of heat energy into pressure energy as desired gases are formed in substantially larger volumes than the original solid volume. In operation, pressure sensor 270 sends pressure data to process controller 272 for maintaining the speed of feed conveyer 256, extrusion conveyer 214, and the heat rate of combustor assembly 220 to achieve desired throughput, conversion temperature, and pressure of delivered product gases. Pressure regulator 274 provides the final adjustment of product gas delivery from regenerative converter 200.

One aspect of the present disclosure is conversion of low cost heat into potential energy as stored energy and the utilization of such pressure to facilitate separation processes, and energy regeneration. Pressurized mixtures are separated while retaining desirable pressurization of selected gases. Such pressurized supplies of refined quality gas are used to power engines including internal combustion engines and engines with external heat supplies.

Such energy conversion, refinement and pressurization are also utilized to deliver refined gases to distant markets by pipeline or pressurized tank cars or by liquefaction, and storage. It is also intended to operate in certain areas in conjunction with one or more of the various embodiments of the copending patent applications including Ser. No. 09/969,860, which are incorporated herein by reference.

The main disadvantage of prior art approaches to hydrogen aided gasification of wastes is the high-pressure, temperature resistant, expensive equipment required. As shown an embodiment of the present invention provides self-reinforcing structures of tubular construction. Strengthening is provided by helical reinforcement structures that combine heat exchange, strengthening, rigidizing, conveying, and heat resisting benefits in modular structures that can be built by rapid assembly processes. This greatly expedites deployment of the remedies needed in waste management and reduces the delivered system cost compared to past approaches.

This provides for efficient separation of carbon compounds such as carbon dioxide or carbon monoxide from gases such as methane and/or hydrogen. Mixtures of product gases are delivered through tube 404 as shown in FIG. 4 to be exposed to water or other absorber fluid selections in pressure vessel 402 for selective separation of carbon dioxide and/or carbon monoxide.

Methane and/or hydrogen are thus delivered to collection tube 408 at the pressure maintained in pressure vessel 402. After absorption of carbon dioxide and/or carbon monoxide, the pressurized absorption fluid is delivered by 410 to nozzle manifold 426 for delivery to heat exchangers such as 414, 416, 418, 420, 422, 424, etc., as shown where heat from the exhaust of engine 202 may be delivered to the heat exchangers shown along with heat released by combustion by burner 444 of portions of the produced gas along with waste gases such as carbon monoxide that is released through 458 by subsequent expansion of the pressurized fluid. Additional heat may also be supplied by solar collector 442 or by resistance or induction heaters using wind or wave energy where such resources are abundant. Heated fluids are then expanded across turbines 430, 432, 434, 436, 438, 440, etc., as shown for recovery and/or conversion of energy to further improve overall efficiency.

Additional improvements in overall efficiency are provided for generation of electricity by a suitable generator such as alternator 280 and/or alternator 428. It is preferable to utilize hydrogen to cool these generators and reduce windage losses. After performing these functions, hydrogen is then used to fuel engine 202 or as a carbon-free fuel in combustor 444 and/or 220.

A general summary of the overall reactions for production of methane from typical organic wastes such as glucose, lignin, and cellulosic feedstocks by the embodiments described is shown in Equation 3.

$$C_6H_{12}O_6 + HEAT \rightarrow 3CH_4 + 3CO_2 \quad \text{Equation 3}$$

In some applications, it is preferred to reduce or eliminate carbon dioxide production by electrolysis of derivatives of the feedstock to produce oxygen as disclosed in the copending patent application. Hydrogen gasification of such materials particularly with hydrogen and surplus carbon present can also be controlled to produce ethane in simultaneous or subsequent process steps. This chemical process variation is favored in instances that it is desired to rapidly convert damaged forests into pressurized supplies of methane, ethane, and hydrogen that are shipped to distant market by pipeline and to then utilize the pipeline to continue delivery of such gases at reduced rates as a function of desired rates of forest thinning, scheduled harvesting, and maintenance programs.

Pipeline capacity established by this approach becomes an important storage system for meeting daily and seasonal variations in market demand. It is generally desired for the resultant pipeline gas to provide about 900 BTU/scf., after removal of carbon dioxide, particulates, ash, sulfur dioxide, and water by the embodiments of FIG. 2 and FIG. 4.

With most wastes, the initial output without recycling hydrogen ranges from 350 to 650 BTU/scf in lower heating value. Increased heating value can be achieved by various selections of pressure and temperature in the decomposition process or by increasing the rate that hydrogen is recycled to the reaction zone at 239. However, the copending patent application discloses SparkInjection technology for enabling full rated power production from internal combustion engines with fuel selections ranging from 250 BTU/scf gaseous mixtures to liquid diesel oil.

The gas mixture produced by operation of the embodiment of FIG. 2 at approximately 1,000 PSI and 1025° F. (69 Atmospheres, 550° C.) varies as shown in Table 1 with the type of wastes being converted, the dwell time, and related parameters of operation. A new formulation provides for compression ignition to replace diesel fuel and includes adsorbed hydrogen in activated carbon suspensions in methanol.

Such gas mixtures are be rapidly produced and can be supplemented with higher energy constituents such as methanol, carbon suspensions in methanol, or propane etc., to achieve virtually any desired energy content of the resulting hydrogen-combustion characterized combustion mixture in combined fuel applications. It is often desired to redirect hydrogen and/or methane produced by the reaction into the reaction zone by injection through manifold 239 at a rate sufficient to produce the desired ratios of methane and ethane to provide pipeline quality gas or feedstocks for chemical synthesis.

TABLE 1

| Gas Product | Forest Waste | Municipal Solid Waste | Manure |
|---|---|---|---|
| Hydrogen (H$_2$) | 22 (vol %) | 33 (vol %) | 20 (vol %) |
| Methane (CH$_4$) | 60 | 53 | 61 |
| Ethane (C$_2$H$_6$) | 17 | 11 | 18 |
| Carbon Monoxide | 1 | 2 | 1 |

In some instances it is preferred to provide methanol as a readily storable and transportable liquid fuel and chemical precursor from the embodiment of FIG. 2. Methanol or "wood alcohol" can be extracted by heating lingocellulosic wastes through partial combustion or by anaerobic heating processes. Equations 4 and 5 summarize the output of methanol that can be achieved by selection of different anaerobic operating temperatures, pressures, and catalysts.

$$C_6H_{12}O_6 + HEAT \rightarrow 6CO + 6H_2 \quad \text{Equation 4}$$

$$6CO + 6H_2 \rightarrow 3CH_3OH + 3CO \quad \text{Equation 5}$$

At higher feed rates and/or lower heat release rates from combustor 220, the charge does not reach the higher temperatures that produce the gases shown in Equation 1 and thus the process produces methanol. It is preferred to separate carbon monoxide from methanol by cooling the methanol vapors to form liquid methanol and to utilize the separated carbon monoxide to fuel engine 202, to release heat through combustion by burner assembly 220, and to form hydrogen by the reaction with water as summarized in Equation 6. Hydrogen produced by the reaction summarized in Equation 6 may be used to produce methanol as shown in Equation 5, to improve operation of engine 202, to improve the yield of methane and/or ethane in converter 200 and/or as a heating fuel in converter 200 as shown.

$$CO + H_2O \rightarrow H_2 + CO_2 \quad \text{Equation 6}$$

It should be noted that each of the reaction systems shown herein may be further improved by the use of homogeneous and heterogeneous catalysts and application of adaptive controls to improve or optimize the desired results. Illustratively regarding the reaction zone between manifold 239 and gas stripper ports 240 it is contemplated to utilize catalyst selections that enhance methane and ethane formation by reactions that facilitate the action of hydrogen to build reactive components that synthesize to form such compounds. Catalysts including chromia and other ceramics with rare earth constituents, the platinum metal group, nobelized nickel, and intermetallics of transition metals are applicable. This provides an unexpected and significant reduction of equipment cost and complexity compared to prior art approaches. Similarly it is contemplated to utilize lanthanide-ruthenium preparations, Fischer-Tropsch catalysts, and copper, copper intermetallics, and/or copper alloys to enhance methanol synthesis from carbon monoxide and hydrogen along with production of methanol by partial oxidation of methane.

Figure 2B:
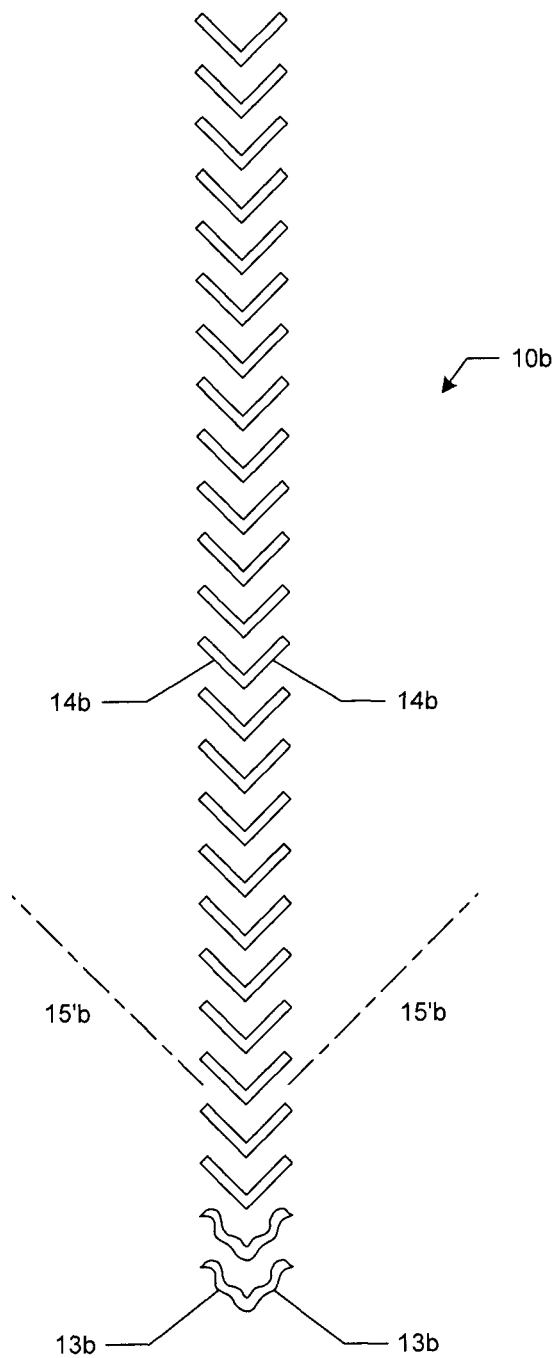
FIG. 2B shows a magnified view of a portion of the embodiment of FIG. 1.
Figure 3:
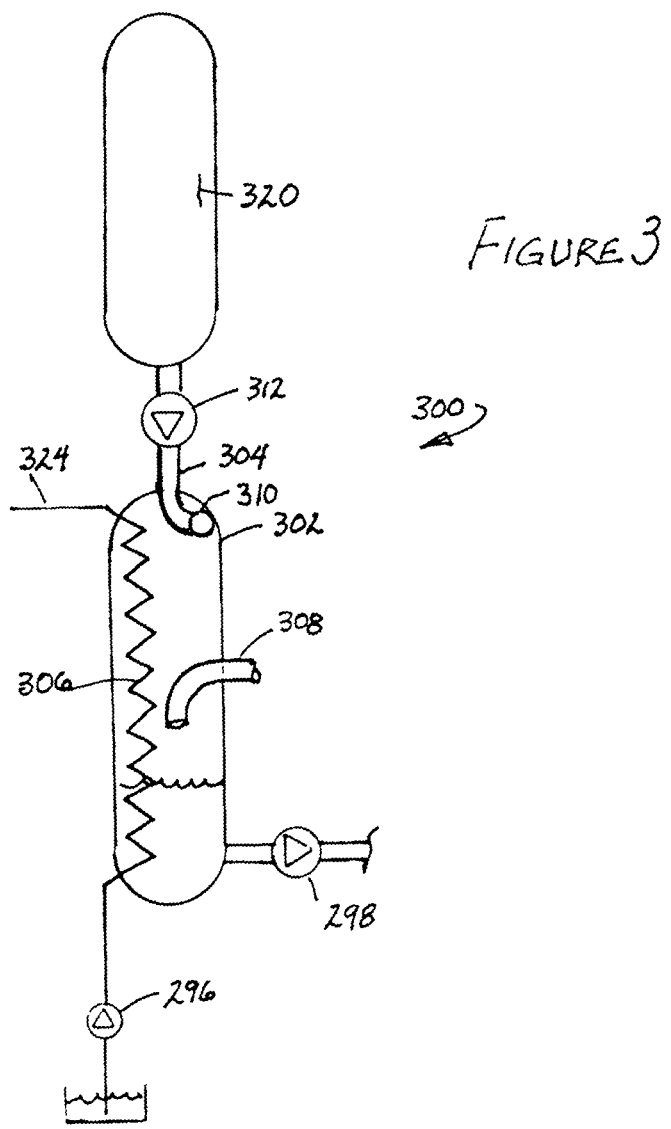
FIG. 3 is a longitudinal section of a magnified view of a portion of an embodiment of a component provided in FIG. 1.

FIG. 3 illustrates separation of methanol from carbon monoxide and shipment of methanol to market by delivery pump 298. In operation embodiment 300 preferably incorporates vortex separation of denser from lighter components and provides for mixtures of carbon monoxide and methanol to enter vessel 302 by tube 304 from regenerative pump/motor 312. Pump/motor 312 provides pumping action on such vapors if the delivery pressure is not adequate to achieve the delivery rate desired and provides recovery of pressure energy if the desired delivery pressure is less than the supply pressure from the system of FIG. 2 or another suitable converter 320.

Cooling to condense methanol is provided by heat exchange circuit 306, which is symbolically shown and preferably utilizes ground water or cooling tower fluid as a heat sink. Water in cooling circuit 306 is preferably maintained at a higher pressure by pump 296 than the vapors that enter chamber 302 and thus any containment failure of the cooling circuit does not cause cooling water contamination. Cooling water that exits separator 302 from 324 may be used as a heated water supply or returned to the ground water system, cooling tower, or evaporation pond as appropriate for the application. After sufficiently cooling the gas mixture to create denser vapors and droplets of methanol near the walls of vessel 302, less dense carbon monoxide is extracted by central tube 308. Condensed methanol may be delivered by pump 298 for further processing to remove water and/or absorbed gases depending upon the purity desired.

Methanol and pipeline gas mixtures of methane, ethane, and hydrogen may be interchangeably shipped to market by the same or additional pipelines. In instances that the same pipeline is used it is preferred to changeover from one chemical type to the other by proven technologies such as the use of a pressure propelled separation slug or by pump down to clear the pipeline before refilling with the next selection to be delivered.

Figure 5:
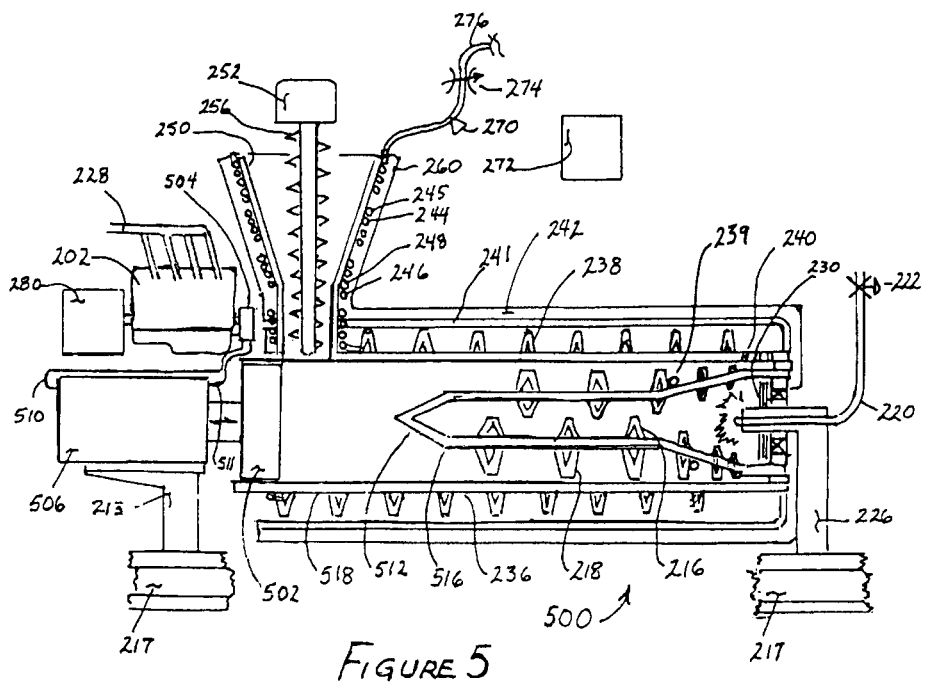
FIG. 5 is a partial sectional view of an embodiment that operates in accordance with the principles of the invention.

FIG. 5 illustrates an embodiment similar to the system of FIGS. 1 and 2 that includes a cylinder compacter 500 for conversion of biomass such as sawdust, manure, and wood chips. This system operates essentially the same as the embodiment of FIG. 2 except compaction of biomass is cyclically provided by a reciprocating ram. Ram piston 502 is forced by hydraulic cylinder 506 to reciprocate in stationery cylinder 518 to compact biomass that has been dried and preheated by countercurrent heat exchange in hopper 250.

Biomass is loaded by conveyer 256 into cylinder 518 when ram 502 is in the position shown. Engine 202 drives hydraulic pump 504 to deliver pressurized working fluid through lines 510 and 511 to actuate cylinder 506. In the forward stroke ram 502 forces the biomass into a dense charge that is further compacted as it moves around cone 512 of heater 516 which may be stationery or rotated to enhance throughput and maintain the compaction of biomass that is progressing through the conversion process. Numerous tubes in positions typical to 249 allow expulsion of air and water vapor while further serving as a material check-valve to prevent backward flow of material that is advanced by the action of ram 502. Countercurrent heat exchange from combustion gases from burner assembly 220 that travel through helical heat exchanger fins 216 and 218 raise the temperature of the biomass sufficiently to cause the dissociation reactions summarized in Equations 1, 3, 4, and 5 in response to coordination and control by controller 272.

Thus organic materials are converted into fluids such as methane, ethane, propane, methanol, ethanol, hydrogen, hydrogen sulfide, carbon monoxide, and carbon dioxide and improved for replacement of fossil fuels by removal of objectionable levels of hydrogen sulfide, carbon monoxide, and carbon dioxide by the regenerative embodiment of FIG. 4 or by another suitable selective removal process such as pressure swing absorption, temperature swing absorption, solution absorption, and membrane separation. This is provided by countercurrent heat exchange from sources such as combustion of a portion of one or more fuel constituents from such fluids, heat exchange from higher temperature to lower temperature substances before, during, and after production, and by heat exchange with energy conversion devices such as internal combustion engines, external combustion engines, expansive motors, and fuel cells.

Figure 6:
FIG. 6 depicts process steps for operation in accordance with the principles of the invention.

FIG. 6 shows process steps 60 for converting methane from landfills, sewage treatment plants, waste disposal operations including those based on the embodiments of FIGS. 1, 2, 3, 4, and 5 along with other methane sources into hydrogen and carbon as summarized in Equation 2. Hydrogen combusts seven to nine times faster compared to hydrocarbons such as gasoline, fuel alcohols, methane, and diesel fuel. This enables improved efficiency and lower carbon or no carbon emissions by turbine, rotary combustion, and reciprocating engine operations in which hydrogen or hydrogen-characterized fuels such as mixtures of hydrogen and methane, hydrogen and methanol, or hydrogen and carbon monoxide are injected and ignited.

Improvements in thermal efficiency by such operations are particularly important for intermittent combustion engines such as rotary combustion engines and reciprocating two- or four-stroke engines such as 202 whereby direct injection and/or ignition is provided close to, at, or after top dead center to reduce or avoid heat loss and backwork during compression. This assures much greater efficiency in the conversion of fuel potential energy to work energy during the power stroke of the engine. Thus by combusting fast burning hydrogen-characterized fuel within surplus air in the combustion chamber, considerably greater operating efficiencies are achieved compared to engines with conventional arrangements to utilize propane, natural gas or diesel fuels.

In step 62 of FIG. 6, methane that has been produced and purified to the desired degree by the embodiments of FIGS. 1, 2, 3, 4, and 5 is transported by bulk carrier or pipeline to a suitable destination such as an industrial park. Methane is then preheated in step 64 from ambient temperature to a suitable temperature such as about 1200° C. (2200° F.) by countercurrent heat exchange from hydrogen and/or carbon that is produced by dissociation. Sufficient heat addition in step 66 is provided by radiation and/or contact with a heated substance such as graphite, iron oxide, aluminum oxide, magnesium oxide, various carbides or other ceramics to cause carbon to be precipitated on or near such heated substance selections and hydrogen is released as summarized by Equation 2. Step 68 provides for collection of such hot hydrogen for countercurrent heat exchange with advancing methane as described regarding step 64. In step 70 carbon that is formed by dissociation of methane is collected as a deposit or as a powder or flake material that is stripped or exfoliated from the heated substrate used in step 66.

In the alternative, step 72 provides for a portion of the carbon and/or the hydrogen that is coproduced in step 66 to be combusted to heat or assist with heat addition to produce the desired pressure and temperature for dissociation of methane. Alternative sources of heat addition for accomplishing dissociation of methane by step 66 include concentrated solar energy, electric induction heating of a conductive ceramic such as graphite or zirconium oxide, resistance heating of such substrates and radiative heating of such substrates from a suitable incandescent source, various varieties of plasma heating including plasma involving hydrogen and/or methane, and/or by combustion of a suitable fuel including the methane or the products of methane dissociation such as hydrogen and or carbon.

Figure 7:
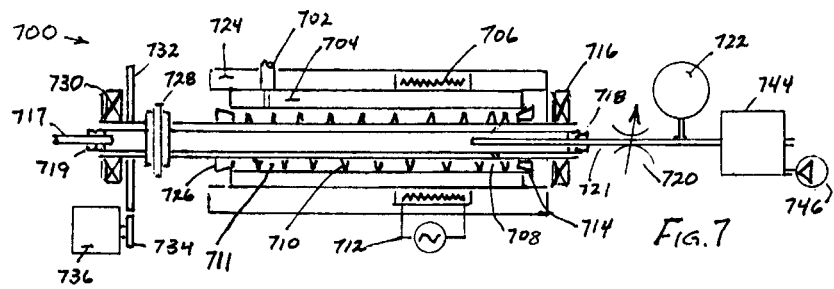
FIG. 7 is a schematic view of an embodiment that operates in accordance with the principles of the invention.

Apparatus for the method provided in steps 62, 64, 66, 68, 70, and/or 72 include various types of fluidized beds, helical screw or piston induced flow reactors, plasma chambers with carbon collection provisions and features, and improved carbon-black production furnaces. Particularly important benefits of some embodiments of the invention include hydrogen production from hydrocarbons such as methane with much lower energy addition than required to dissociate water and that valuable forms of carbon are coproduced. Dissociation of hydrocarbon feedstocks to produce hydrogen and products such as derived by the disclosures in the U.S. patent application Ser. No. 09/370,431 provide high combined values for carbon products and hydrogen. FIG. 7 shows another particularly efficient system for facilitating the method.

FIG. 7 shows components of a process system 700. In operation, a hydrocarbon such as methane is delivered by pipe 702 to refractory tubular barrel 704 within which refractory conveyer screw 710 is rotated to move particles and/or substrate materials 711 of preferred geometry and size to receive carbon that is dissociated from methane and deposited or precipitated as the methane is heated by radiation, conduction etc., according to the process summarized in Equation 2. Hydrogen that is coproduced is ducted through holes 708 of hollow screw conveyer 710 to the interior bore as shown. Thus hot hydrogen and carbon that travel towards seal 726 exchange heat with methane that travels toward seal 714. Helical screw 710 serves as an energy exchange system for conductive and radiative heat along with performing mechanical work to rapidly accomplish the reactions summarized by Equation 2.

Heat addition provided by suitable heat source 706 causes dissociation of the preheated methane. Heat may also be added by combustion of hydrogen within the hollow center of refractory screw assembly 710 as shown. Oxygen or another oxidant such as air is delivered through rotary union 718 is used for such combustion. Oxygen is preferably provided by air separation or electrolysis according to the copending patent applications. Hydrogen is delivered by conduit 717 through rotary union 719 as shown.

Depending upon the size of converter, speed reduction components such as sprockets and chain or drive gear 732 and bearing support assembly 730 are preferably thermally isolated from rotating screw assembly 710 by a torque-conveying thermal insulator assembly 728. Similarly insulating support of bearing and rotary union 716 assembly with 718 is provided to minimize heat transfer from screw assembly 710. Insulator pack 724 provides heat-transfer blocking to prevent radiative and conductive heat losses and other areas where protection from heat is needed. A relatively small portion of the methane and/or hydrogen and/or carbon monoxide generated as summarized by Equations 1 and 2 is delivered to an engine generator assembly similar to 202 and 280 as shown in FIG. 2 to provide heat and electricity for support operations including electric drive motor 736, electrolyzer and/or air separator 744 pump or compressor 746, and generator 712 as shown.

It is preferred to provide progressively reduced pitch of helical flights and/or to reduce the cross-sectional area between rotating screw 710 and stationery tube barrel 704 in zones that serve as plug seals for the purpose of constantly compacting solid materials that are entrained within, as shown. This forces travel of methane in counterflow direction to carbon traveling towards extrusion through 726 and hydrogen that travels toward rotary union 719 within 710 as shown. Decreasing the pitch of the screw conveyer or reducing the cross section near or at 726 and 714 to compact carbon particles or shapes further provides for a compact seal against the escape of hydrogen or methane. In larger applications screw 710 may be provided with slightly reversed pitch in the zone near seal 714 to cause compaction of carbon to produce an effective seal against methane or hydrogen loss.

Insulation system 724 facilitates efficient countercurrent heat exchange between hydrocarbons such as methane advancing toward seal 714 and carbon and/or hydrogen advancing toward seal 726. Gear or sprocket drive 732 is thermally isolated from drive motor 736 and bearings 716 and 730 are designed for heat isolation and/or elevated temperature service. Screw conveyer 710 and barrel 704 are made of refractory metals or ceramic material selections such as graphite, carbides, nitrides, intermetallics, and metallic oxides. Heat addition at 706 may be by concentrated solar energy, catalytic or flame combustion, or by electrical heating such as plasma, resistance or inductive principles preferably using renewable electricity. Oxygen produced by air separator and/or electrolyzer 744 is stored in accumulator 722 and delivered through pressure regulator 720 and is used when needed to provide for combustion of hydrogen and heat generation for the dissociation process such as during times that solar, wind, moving water and other renewable resources are not available or not adequate.

Figure 8:
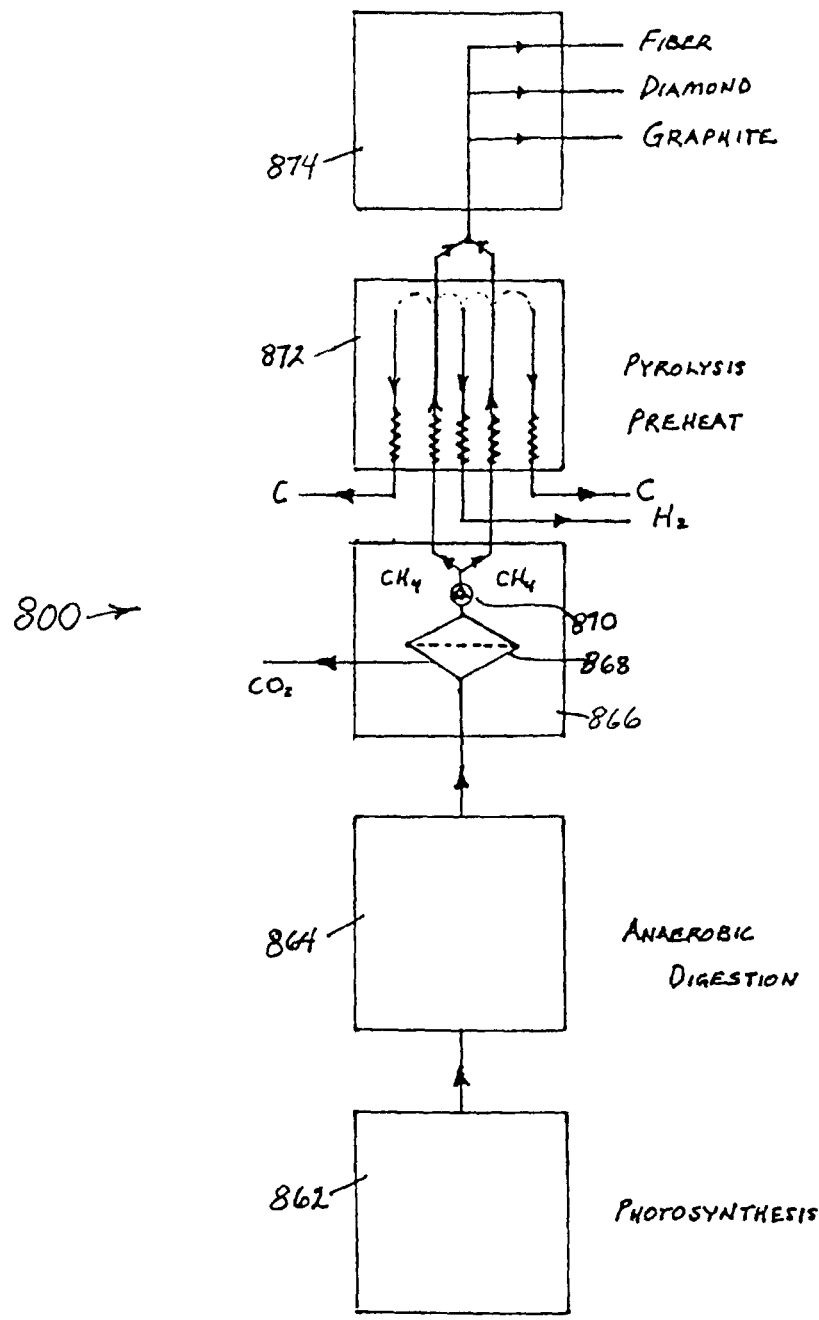
FIG. 8 depicts operations in accordance with the principles of the invention.

FIG. 8 illustrates the overall process 800 in which photosynthesis provides organic material typically containing carbon, hydrogen, and oxygen in step 862. Step 864 provides anaerobic digestion or pyrolysis or partial oxidation to produce fuel gases such as methane and oxides of carbon. Separation of the oxides of carbon such as carbon dioxide from fuel gases is provided in step 866. Appropriate filter, pressure swing adsorption, temperature swing adsorption, or selective absorption as disclosed in the copending patent application is provided by the system depicted as 868. Depending upon the pressure of purified fuel gases and desired pressure for the process of step 872, pressurizer 870 is utilized which includes selections such as a electrolysis pressurization, mechanical pump or compressor operation, or pressurizing release from adsorptive and/or metal hydride systems. In step 872 methane is preheated by countercurrent heat exchanges with hydrogen and carbon prior to final heat addition for dissociation as shown. Subsequent provisions for heat addition are selected to specialize products made from carbon derived from preheated methane in step 874 as shown.

FIG. 9 shows details of embodiment 900 including solar concentration mirror 912 concentrated radiation receiver 914, stationery receiver tube 922 and rotary screw conveyer and extruder tube 924 in which integral helical screw flights 926 force reactive ingredients such as organic material into zone 930 where it is rapidly heated to a high temperature by concentrated solar energy. Sufficient concentration of solar energy is readily achieved by parabolic, spherical, or arrayed heliostatic mirrors to produce typical operating temperatures of 500° C. to 2500° C. as facilitated by the physical and chemical properties provided by the material and configuration specifications of containment tube 922.

Stationery base 904 houses a drive system and provides transfer of materials to and from reactor 914. Fuels and feedstocks such as landfill methane for reactor 914 are delivered by connection to pipeline 918. In instances that a fluid feedstock such as constituents of sewage are processed by reactor 914 it is preferred to provide delivery by connection to pipeline 915. Electricity produced or delivered is transferred by cable group 917. Hydrogen and/or other fluids produced by reactor 914 are delivered to pipeline 916 for storage and distribution to contract sales. Stage 906 rotates around a central vertical axis to provide sun tracking of reactor 914, which is assembled with mirror 912. Coordinated rotation around horizontal axis 909 in support 910 as shown is provided to track the sun and produce point focused solar energy that is reflected from mirror assembly 912. Organic solids and semi-solids to be heated are loaded into hopper 908, which feeds such materials into screw conveyer 924 a portion of which is shown in FIG. 10.

Other forms of renewable heating are readily adapted such as inductive or resistive heating using electricity from a generator powered by moving water, wind, wave action, or by an engine using fuel produced by the operation described herein. Similarly, it is contemplated to combust a portion of the fuel produced by reactor 914 to adequately heat zone 930 for accomplishing the reactions of Equations 1, 2 and 5. This group of alternate heat inputs to zone 930 illustrates preferred provisions for supplementation or replacement of solar energy as needed to assure continued operation in case of intermittent cloud cover or at night.

Supplemental heating or replacement of solar heat for zone 930 by partial combustion of produced hydrogen and/or carbon monoxide is preferably accomplished by delivering oxygen through tube 937 within bore 931 of tube 932 from electrolyzer 907. An important synergistic benefit is provided by operation of heat engine 903 on landfill methane and/or hydrogen for driving electricity generator 905. Surplus electricity generating capacity is used to produce oxygen and hydrogen in electrolyzer 907. Hydrogen produced by such operation can readily be stored in pipeline 916 for contract sales and oxygen can be used to greatly improve the process efficiency of heat generation by partial combustion of fuel produced by reactor 914 and/or in fuel cell power generation applications.

Elimination of nitrogen greatly reduces the cost of hydrogen purification by condensing or filtering water from the gas mixture within tube 932 when oxygen is used to produce heat by partial combustion. Tube 937 delivers oxygen as shown to combust the amount of fuel needed with minimum heat loss and elimination of heating requirements for nitrogen which would be present if air is used as an oxidant.

Tube 922 thus performs the functions of containing organic feedstocks in an anaerobic condition and transferring energy such as solar energy to biomass that is conveyed into the concentrated heating zone 930 to facilitate the reactions summarized as follows:

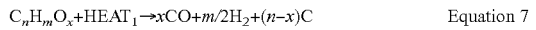

$$C_nH_mO_x + HEAT_1 \rightarrow xCO + m/2 H_2 + (n-x)C \qquad \text{Equation 7}$$

$$C_6H_{10}O_5 + HEAT_2 \rightarrow 5CO + 5H_2 + C \qquad \text{Equation 8}$$

Small amounts of $NH_3$, $H_2S$, $N_2$, and $H_2O$ may also be found in the gaseous products with the CO and $H_2$ that are forced by the compacted solids into the center bore 931 of rotary screw tube 932 as shown. $H_2S$ is preferably reacted with iron to form iron sulfide or collected in carbon produced by the process as hydrogen is released. It is preferred to collect fixed nitrogen typically as ammonia and sulfur as iron sulfide and to utilize these substances as soil nutrients along with mineral ash collected by some embodiments of the invention.

Solids such as carbon and ash 936 are extracted from zone 930 by the rotating motion of screw tube 932 along flights 934 as shown. High temperature insulation 940 is preferably used to cover the end of receiver 914 as shown and insulated area 942 provides heat conservation along the countercurrent exchange of heat made between carbon rich solids being extracted by screw conveyer 932 and biomass moving towards the heated zone 930 of the receiver and reactor assembly. During times that solar energy is not available, insulator sleeve 948 is used to cover zone 930 and is preferably supported and guided to and from the stored position shown by telescoping tube guides, which are not shown.

Water and other gases removed at early stages of compaction and countercurrent pre-heating are preferably vented through louvers or holes 944 to allow extraction through collection tube 946. For many feedstocks such as manure and sewage, this water generally contains fixed nitrogen and other soil nutrients and preferably is utilized to replenish soil tilth and productivity.

In instances that pure carbon and pure hydrogen are preferred, the biomass may be pre-treated to remove ash forming materials such as calcium, magnesium, phosphorus, iron, and other minerals. Ash ingredients of biomass are often wastefully impounded in landfills or allowed to escape to the oceans as effluent is dumped from sewage and garbage disposal operations. In some embodiments of the invention ash is readily collected and returned to useful applications as a soil nutrient. This may be accomplished by a combination of mechanical separation and dissolution of the biomass in a suitable solvent to separate ash components.

Another embodiment provides anaerobic digestion of biomass such as carbohydrates and cellulose according to the following general reactions:

$$n(C_6H_{10}O_5) + nH_2O + HEAT_3 \rightarrow n(C_6H_{12}O_6) \qquad \text{Equation 9}$$

$$n(C_6H_{12}O_6) \rightarrow 3n(CH_4) + 3nCO_2 + HEAT_{10} \qquad \text{Equation 10}$$

Soil nutrients captured in the aqueous liquor remaining after the processes shown are efficiently transferred to depleted soils by various techniques including addition to irrigation water. Carbon dioxide is readily removed from the products of the process by cooling to produce phase change separation or by adsorption in a suitable solvent such as water. Carbon dioxide is soluble in water to the extent of about 21.6 volumes of gas per volume of water at 25 atmospheres pressure and 12° C. (54° F.). Increasing the pressure and/or decreasing the temperature increases the amount of carbon dioxide dissolved per volume of water. After separation of carbon dioxide from methane, lowering the pressure or increasing the temperature releases dissolved carbon dioxide.

The amount of heat required in the process of anaerobic dissociation of organic feedstocks to produce a given amount of sequestered carbon is considerably less than the energy required to collect and dissociate carbon dioxide from the atmosphere. The apparatus required to practice the process of carbon sequestration from organic feedstocks is far less involved and much simpler and more rugged than would be required to extract carbon dioxide from the atmosphere and to break it into carbon and oxygen.

In the process of converting hydrocarbons including biomass solids and methane into carbon and hydrogen, the products of dissociation reactions tend to occupy more volume than the reactants. Apparatus 920 of assembly 914 for carrying out these endothermic reactions can readily seal the reaction zone 930 with carbon rich material that is compacted by extruder flights 926 along the inlet to zone 930 and with carbon rich material along extruder flights 934 of the outlet of zone 930 so that the hydrogen and other gases passing out through bore 931 may be pressurized to the desired extent and maintained by a rotary union and pressure regulation means on the outlet of bore 931.

It is preferred to pressurize cool methane to the desired delivery pressure of hydrogen from reactor 920 with a suitable pressurization technique including pressurization by release from adsorptive substrates, phase change, mechanical compression, and hybridized systems before methane entry into reactor 920. If the gases produced in anaerobic digestion are separated by liquefaction, this is readily accomplished by vaporizing the methane to the pressure desired. Pressurization by various pumps and compressors 870 may also be used for this purpose.

Types of carbon that may be produced vary greatly depending upon market demand and the corresponding temperature and pressure at which the process of carbon sequestration is accomplished. Methane delivered to manufacturing stage 874 may be processed as needed to produce fibers, carbon black, diamond-like plating on suitable substrate, graphite crystals and in many other forms corresponding to the copending disclosures in U.S. patent application Ser. Nos. 08/921,134; 08/921,134 and 09/370,431.

It is also contemplated as a heat conservation advantage for certain applications that screw conveyer 932 would be designed as the feed path and preheater with hydrogen being delivered through bore 931 and carbon produced by the reaction in zone conveyed by appropriately designed extruder 924 in countercurrent heat exchange with incoming feedstock. This arrangement provides for countercurrent heating of the incoming feedstock from inside and from the outside before reaching zone 930 by parallel flows of products passing in the opposite direction of feedstock.

Carbon formed by the reaction is carried by screw conveyer 932 in countercurrent heat exchange with tube 924 to preheat the incoming methane and thus increase the overall efficiency and rate that solar energy completes the process reactions. Hydrogen produced is collected in bore 931 of tube conveyer 932 and heat is removed in countercurrent heat exchange with reactants passing towards zone 930. Renewable hydrogen produced can be used fuel cells or in heat engines that actually clean the air and provide cleaner exhaust than the ambient atmosphere.

Carbon continuously forms a gas-tight seal between conveyer flights 926 and the inner wall of tube 922 as it is produced by the process. This is preferably assured by reducing the helical extruder screw flight lead where the greatest compaction is desired. It is generally desired to provide the greatest carbon compaction and sealing effect after the material undergoing conversion to hydrogen passes zone 930 on the outlet in screw conveyer past zone 930.

It is contemplated that conveyance of reactants in processes shown would be by numerous other means in addition to screw conveyers as shown. Illustratively biomass could be forced to the reaction zone by a reciprocating plunger in place of screw conveyer 924 and carbon can be extracted from the hot end by other extraction methods including a chain drive conveyer in place of screw conveyer 932.

In instances that it is desired to produce a liquid fuel or vapors of a solvent such as one or more turpenes along with other valuable products, the reaction temperature may be adjusted usually to reduced temperature or the throughput rate of ingredients increased. Useful compounds such as hydrogen, carbon, methanol, biodiesel and turpentine may be produced and collected in tube bore 931 as summarized in the equations or a portion of a typical biomass waste feedstock with the average compound formula shown:

$$C_6H_{10}O_5 + HEAT_6 \rightarrow CH_3OH + 4CO + 3H_2 + C \qquad \text{Equation 11}$$

Incorporation of colloidal carbon that hosts adsorbed hydrogen in methanol provides higher heating value per volume and the ability to provide compression ignition in applications for renewable diesel fuel. If a greater yield of liquid fuel and/or solvent is desired, carbon monoxide and hydrogen produced in the typical process of Equation 11 may be reacted, preferably in the presence of a suitable catalyst, to produce additional methanol and hydrogen.

$$4CO + 3H_2 \rightarrow 4CH_3OH + H_2 + HEAT_{12} \qquad \text{Equation 12}$$

The rate of biomass travel into zone 930 and the rate of extraction of solid residues by helical conveyer 932 is preferably controlled by a computer that responds to adaptively control the process in response to instrumentation of the pressure, temperature, and other indicators of the kind and quality of products desired in the gas, vapor and solid residue streams.

Carbon monoxide may be decomposed or converted to desired forms of sequestered carbon by disproportionation as shown by the process summarized in Equation 8:

$$2CO \rightarrow C + CO_2 + HEAT_{13} \qquad \text{Equation 13}$$

Disproportionation as summarized in Equation 13 is exothermic and can be provided under various combinations of temperature and pressure conditions including operations at 10-40 Atmospheres pressure at 500° C. to 800° C.

If market conditions favor hydrogen production for fuel cells or heat engines that clean the air, carbon monoxide can be reacted with steam in an exothermic reaction to produce hydrogen as shown in Equation 9:

$$CO + H_2O \rightarrow CO_2 + H_2 + HEAT_{14} \qquad \text{Equation 14}$$

Carbon monoxide produced by the processes summarized can be converted into numerous products to meet market demand as selected from processes requiring hydrogen and/or carbon production as illustrated. It is preferred to utilize heat released by the exothermic processes as part of the heat addition needed for endothermic reactions shown.

Thus some embodiments of the invention offer a practical process for sequestration of carbon from the atmosphere consisting of photosynthesis, collection of photosynthesized biomass, and heating the biomass to yield products selected from the group including carbon, hydrogen, methanol, turpenes, and ash. Biomass wastes that are ordinarily allowed to rot into the atmosphere and which contribute to carbon dioxide and/or methane buildup can now be utilized to efficiently produce hydrogen, carbon products and soil nutrients.

Figure 11:
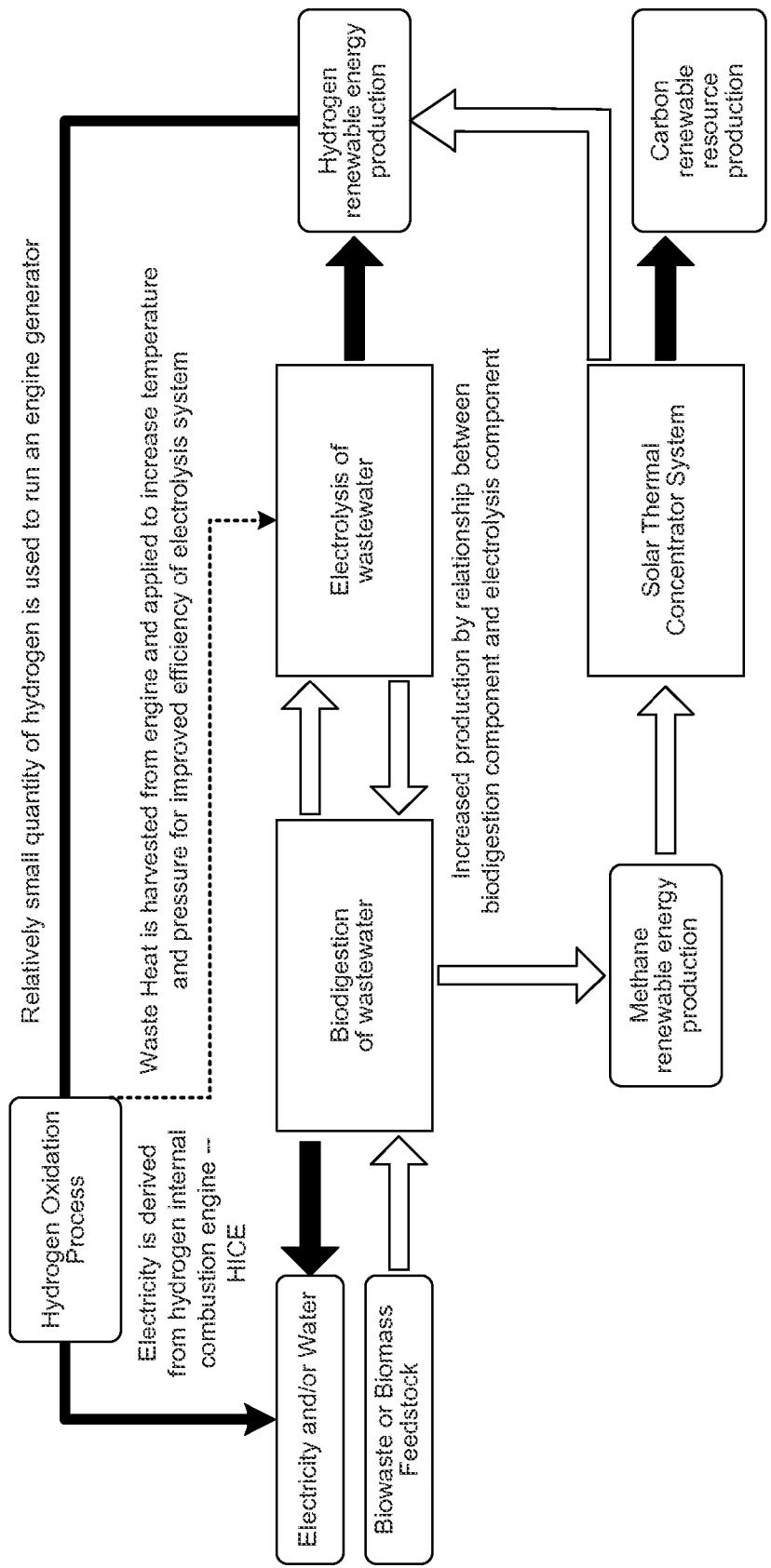
FIG. 11 shows a preferred embodiment in which a hydrogen internal combustion engine is the electricity source and heat source for the system.

FIG. 11 shows a preferred embodiment in which a hydrogen internal combustion engine is the electricity source and heat source for the system. (not shown is that oxygen and potable water are also by products of the system). FIG. 11 emphasizes that once the process begins, it is self-sustaining in that a relatively small amount of hydrogen is used to power the system. Energy efficiency is obtained by the relation between biodigester and electrolyzer. Energy efficiency is further obtained by the specialization of the solar thermal dish technology: cracking methane into its constituents: hydrogen and carbon. According to one embodiment, cracking of methane would not occur at night. According to aspects of the disclosure, distributable mass scale renewable energy production of hydrogen fuel is thereby achieved. According to further aspects, distributable mass scale renewable resource production carbon (undifferentiated carbon fiber or carbon ash) is thereby achieved. According to still further aspects, distributable mass scale manufacturing of differentiated, specialized carbon is thereby achieved by use of distinct apparatus. When distributed mass scale renewable resource extraction and harvesting is combined with renewable energy harvesting, the result is a sustainable economic development and production.

This is to say that from renewable resources and energy one gains refined renewable resource and energy that has greater economic value, and in turn is used to create durable goods which serve to harvest new renewable resources and energy is a sustainable, non-polluting and non-depleting manner. According to aspects of the disclosure, this sustainable economic model could be written as a recursive algebraic formula for this sustainable economic model. (A Recursive formula is a formula that is used to determine the next term of a sequence using one or more of the preceding terms.) Use of some embodiments of the invention within a system of production yields an economic multiplier effect on (a) the biomass feedstock, (b) the methane feedstock, and (c) on the carbon; then methane/hydrogen is used to harvest more renewable energy and renewable material resource; then carbon turned into a durable good that harvests more (a) and (b) and produce more (c). Thus, the disclosure embodies the mathematics of economic "sustainability."

Figure 12:
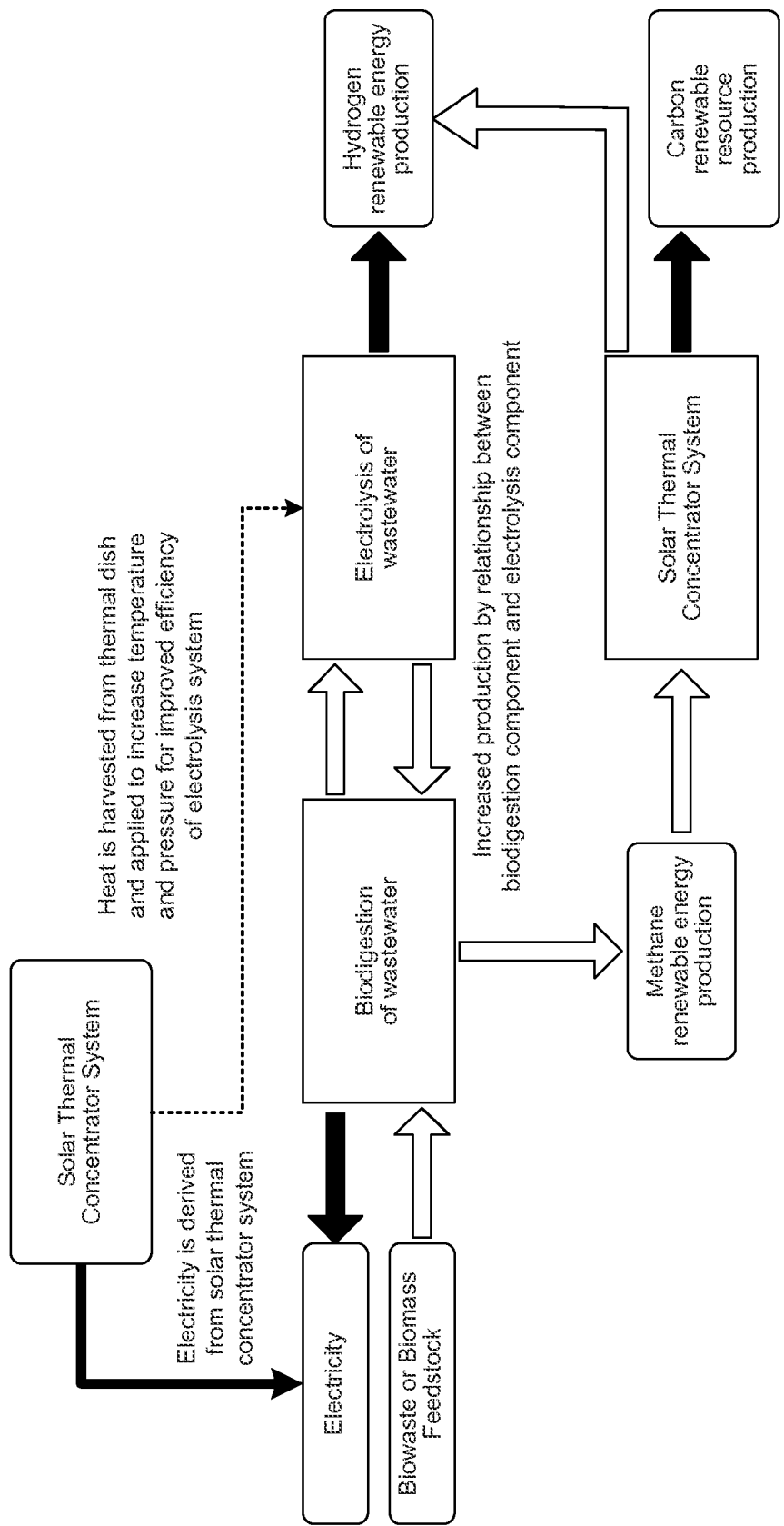
FIG. 12 shows a preferred embodiment in which the solar thermal concentrator system is the electricity source and heat source for the system.
Figure 13:
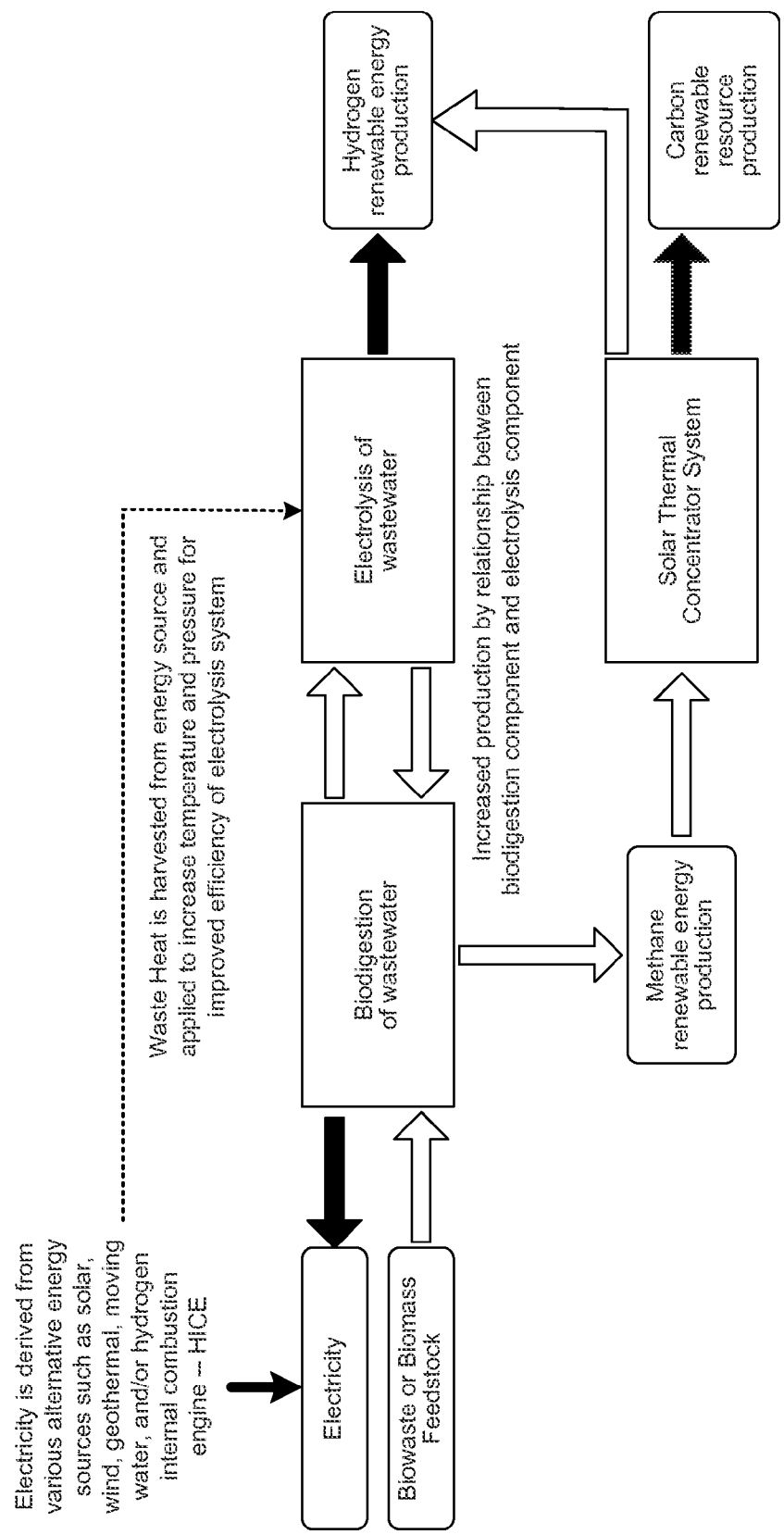
FIG. 13 shows a preferred embodiment in which the electricity source and heat source is not specified so as to make room for future variability and adaptability of the system.
Figure 14:
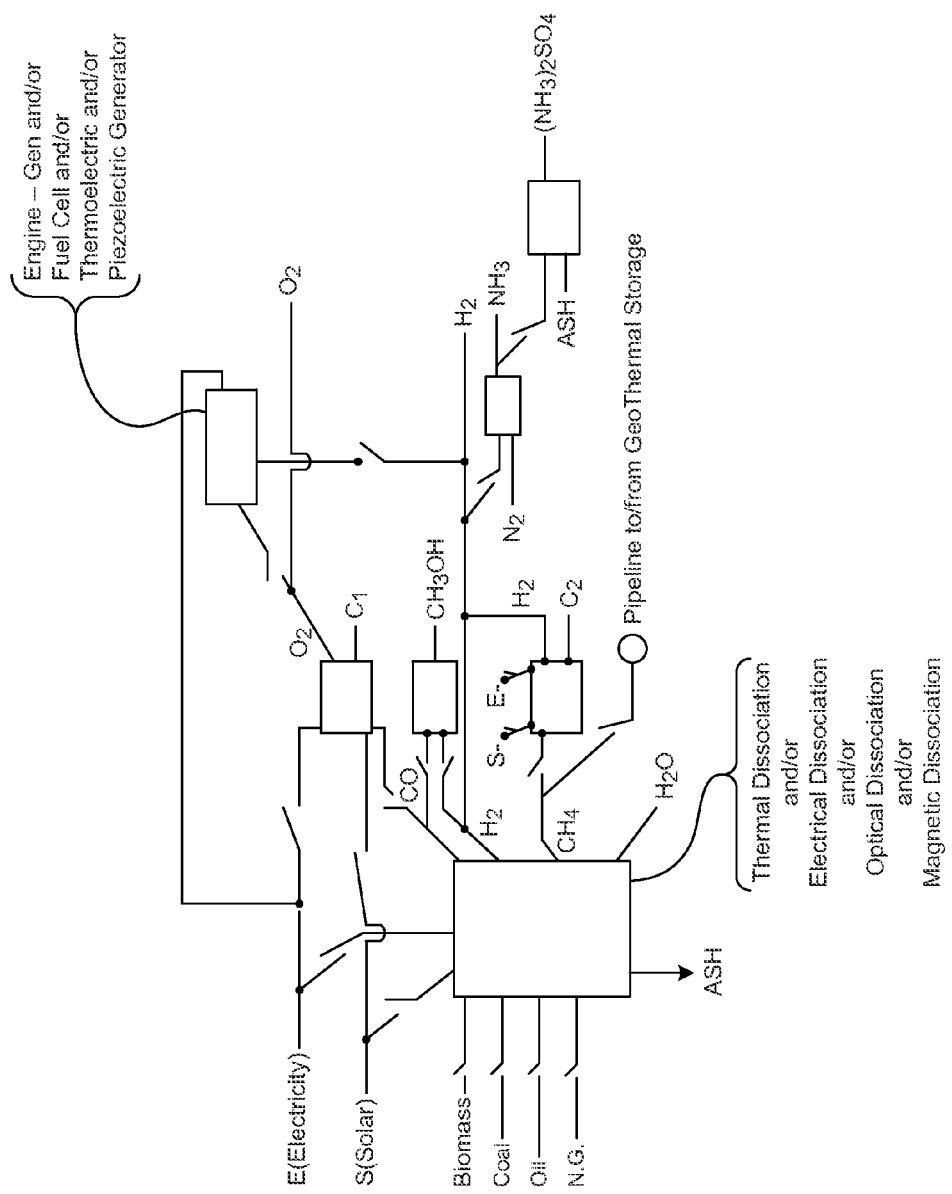
FIG. 14 shows a flow chart for a process of renewable enemy production.

FIG. 11 does not necessarily illustrate the economic implication of mass scale storage. Energy production that is both distributable (many locations) and scalable (capable of large quantity production) is an improvement over methods which are distinctly local and non-scalable. FIG. 12 shows a preferred embodiment in which the solar thermal concentrator system is the electricity source and heat source for the system. FIG. 13 shows a preferred embodiment in which the electricity source and heat source is not specified on as to make room for future variability and adaptability of the system. FIG. 14 shows a flow chart for a process of renewable energy production.

The above embodiments may be accomplished by an electrolyzer as disclosed in herein.

In one embodiment of the present invention an electrolytic cell is provided comprising a containment vessel; a first electrode; a second electrode; a source of electrical current in electrical communication with the first electrode and the second electrode; an electrolyte in fluid communication with the first electrode and the second electrode; a gas, wherein the gas is formed during electrolysis at or near the first electrode; and a separator; wherein the separator includes an inclined surface to direct flow of the electrolyte and the gas due to a difference between density of the electrolyte and the combined density of the electrolyte and the gas such that the gas substantially flows in a direction distal to the second electrode.

In another embodiment, an electrolytic cell is provided comprising a containment vessel; a first electrode; a second electrode; a source of electrical current in electrical communication with the first electrode and the second electrode; an electrolyte in fluid communication with the first electrode and the second electrode; a gas, wherein the gas is formed during electrolysis at or near the first electrode; a gas extraction area; and a separator wherein separator comprises two inclined surfaces forming a "V" shape; wherein the separator directs flow of the electrolyte and the gas due to a difference between density of the electrolyte and the combined density of the electrolyte and the gas such that the gas substantially flows in a direction distal to the second electrode, and wherein the separator is further configured to promote circulation of the electrolyte between the first electrode, the gas extraction area, and the second electrode to provide fresh electrolyte to the first electrode and the second electrode.

In yet another embodiment, an electrolytic cell is provided comprising a containment vessel; a first electrode; a second electrode; a source of electrical current in electrical communication with the first electrode and the second electrode; an electrolyte in fluid communication with the first electrode and the second electrode; a gas, wherein the gas is formed during electrolysis at or near the first electrode; and a separator; wherein the separator includes an inclined surface to direct flow of the electrolyte and the gas due to a difference between density of the electrolyte and the combined density of the electrolyte and the gas such that the gas substantially flows in a direction distal to the second electrode.

In another embodiment, an electrolytic cell and method of use is provided. While the electrolytic cell may be used in many applications, it is described in this embodiment for use in the production of hydrogen and oxygen. An electrolytic cell according to the present embodiment provides for reversible separated production of pressurized hydrogen and oxygen and tolerates impurities and products of operation. The embodiment further provides the option for operating an electrolysis process which comprises the steps of supplying a substance to be dissociated that is pressurized to a much lower magnitude than desired for compact storage, applying an electromotive force between electrodes to produce fluid products that have less density than the substance that is dissociated and restricting expansion of the less dense fluid products until the desired pressure for compact storage is achieved. This and other embodiments can improve the energy utilization efficiency of dwellings such as homes, restaurants, hotels, hospitals, canneries, and other business facilities by operation of heat engines or fuel cells and to utilize heat from such sources to cook food, sterilize water and deliver heat to other substances, provide space heating or to facilitate anaerobic or electrically induced releases of fuel for such engines or fuel cells. Moreover, one skilled in the art will appreciate that aspects of the embodiments disclosed herein can apply to other types of electrochemical cells to provide similar advantages.

Contrary to conventional electrochemical electrodes which depend largely upon relatively slow diffusion, convection, and concentration gradient processes to produce mass transport and/or deliver ions for production of desired constituents, the present embodiment provides more efficient mass transport including rapid ion replenishment processes and deliveries to desired electrodes by pumping actions of low-density gases escaping from a denser liquid medium as described herein. This assures greater electrical efficiency, more rapid dissociation, and greater separation efficiency along with prevention of undesirable side reactions. Increasing the rate and efficiency of ion production and delivery to electrodes increases the system efficiency and current limit per electrode area.

Referring to FIG. 1B, an electrolytic cell $2b$ in which a container $4b$ such as a metallic tube serves as a containment vessel is shown. Optionally, the container $4b$ may also serve as an electrode as shown in FIG. 1B. A porous electrode such as cylindrical conductive wire screen electrode $8b$ is coaxially located and separated from tubular electrode $4b$ by an electrolytic inventory of liquid such as an acid or base. Liquid electrolyte occupies the interior space of container $4b$ to the liquid-gas interface in insulator $24b$. A layer of plated, plasma sprayed, or composited electrode material on a dielectric sleeve or a conductive cylindrical inner liner electrode $4b'$ (not shown) may be provided within container $4b$ to serve as an electrically separated element of the assembly to enable convenient replacement as a maintenance item or to serve as one of a number of segmented electrode elements for purposes of optional polarity, and/or in series, parallel, or series-parallel connections. In the present reversible embodiment for the electrolysis of water, electrode $8b$ may be considered the electron source or cathode such that hydrogen is produced at electrode $8b$, and electrode $4b$ may be considered the anode such that oxygen is produced at electrode 4b. Container 4b may be capable of pressurization. Pressurization of the contents of container 4b is restrained by sealed caps 30b and 46b. Support, electrical insulation, and stabilization of components including electrode 8b, gas separator 10b, and electrical connection 32b are provided by dielectric insulator bodies 20b and 24b as shown. Pressurization of the electrolytic cell 2b can be accomplished by self-pressurization due the production of gas(es) during electrolysis, by an external source such as a pump or by any combination thereof.

Separator 10b is configured to be liquid permeable but to substantially prevent gas flow or transport from the cathode side of the separator to the anode side of the separator and vice versa, include substantially preventing the flow of gas dissolved in the electrolyte or after nucleation of gas bubbles. Optionally, electrode 8b may be configured to act as separator 10b such that a distinct separator is not necessary. Alternatively, separator 10b may include the electrode 8b or electrode 8b may include separator 10b. In addition, separator 10b may also include the anodic electrode 4b or anodic electrode 4b may include separator 10b.

Insulator 24b is shaped as shown and as needed to separate, collect and/or extract gases produced by electrodes such as 4b and 8b including utilization in combination with separator 10b. In the concentric cylindrical geometry shown, insulator 24b has a central conical cavity within which gases released on electrode 8b are collected. Concentrically surrounding this central cavity is an annular zone that collects the gases released from the surfaces of electrode 4b' or from the inside of container electrode 4b.

Optionally, a catalytic filter 48b may be placed in the upper collection passage of 24b as shown. Oxygen that manages to reach catalytic filter 48b including travel by crossing separator 10b can be catalytically induced to form water by reacting with hydrogen, which may then return to the electrolyte. The vast excess of hydrogen can serve as a heat sink to prohibit the heat released by this catalytic reaction from affecting the electrolytic cell. Purified hydrogen is supplied at fitting 26b as shown. Similarly it may be preferred to provide a catalytic filter 49b in the upper region of the circumferential annulus that collects oxygen as shown, for converting any hydrogen that reaches the oxygen annulus into water. Oxygen is removed at fitting 22b as shown. Alternatively, the catalytic filters may be placed at, near or inside fittings 22b and 26b.

In illustrative operation, if water is the substance to be dissociated into hydrogen and oxygen, a suitable electrolyte is prepared such as an aqueous solution of sodium bicarbonate, sodium caustic, potassium hydroxide, or sulfuric acid and is maintained at the desired level as shown by sensor 50b that detects the liquid presence and signals controller 52b to operate pump 40b to add water from a suitable source such as reservoir 42b as needed to produce or maintain the desired inventory or pressure. Controller 52b is thus responsive to temperature or pressure control sensor 58b which may be incorporated in an integrated unit with liquid level sensor 50b or, liquid inventory sensor 51b and control pumps 36b and 40b along with heat exchanger 56b which may include a circulation pump of a system such as a radiator or heater (not shown) to receive or deliver heat. Similarly, a heating or cooling fan may be utilized in conjunction with such operations to enhance receipt or rejection of heat from sources associated with the electrolytic cell 2b.

In some embodiments where the electrolytic cell 2b is to be applied cyclically, e.g., when surplus electricity is inexpensive and not otherwise demanded, electrolytic cell 2b can be operated with considerable variation of the water inventory. At times that surplus electricity is not available or it is turned off, hydrogen and oxygen supplies may be extracted from container 4b and the system is allowed to return to ambient pressure. Ambient pressure water can then be added to fully load the system, which can be provided to have a large annular volume around the circumference of insulator 24b as may be desired to facilitate such cyclic low-pressure filling and electrolysis operations to deliver hydrogen or oxygen at the desired high pressure needed for pressure or chemical energy to work conversions, compact storage, and provide rapid transfers to vehicles, tools, or appliance receivers.

Upon application of current and generation of voluminous gaseous supplies of hydrogen and oxygen from a much smaller inventory of liquid, the system may be pressurized as desired and remains pressurized until the inventory of water in solution is depleted to the point of detection by sensors 50b or 51b which enables controller 52b to either interrupt the electrolysis cycle or to add water by pressure pump 40b from reservoir 42b as shown. It may be preferable to add water across a valve such as check valve 44b as shown to allow multiple duties or maintenance on pump 40b as needed.

Figure 3B:
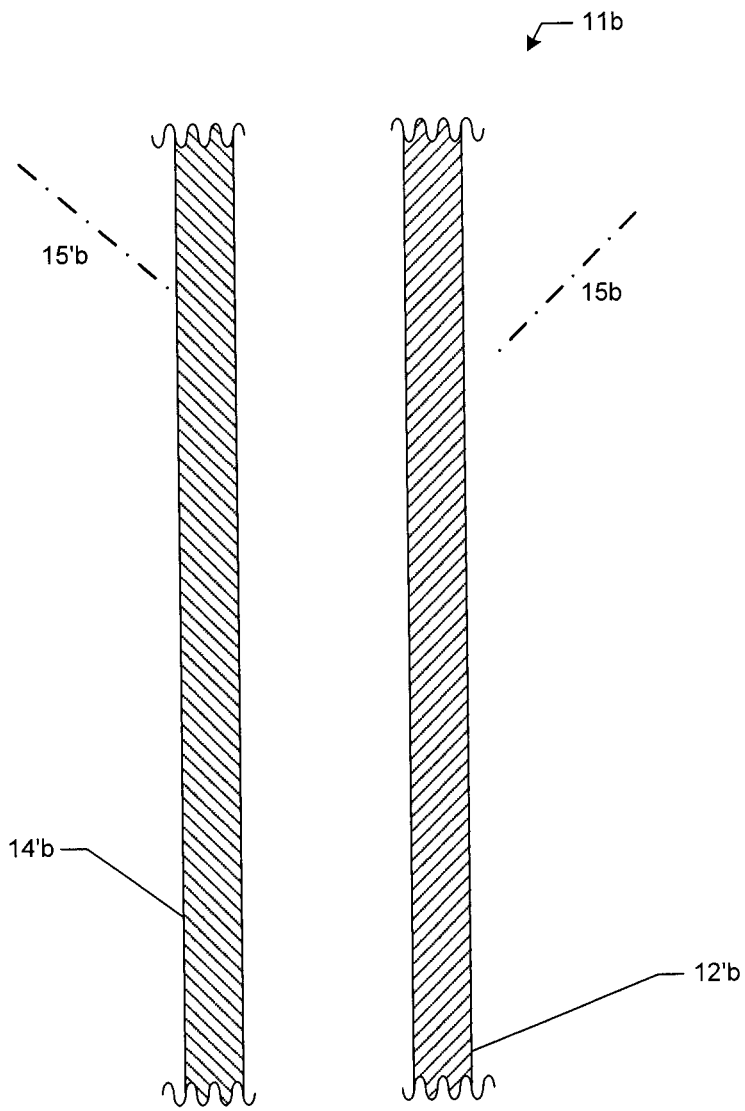
FIG. 3B shows a variation of the embodiment of FIG. 2.

Referring to FIGS. 1B, 2B and 3B, FIG. 2B shows one embodiment of the separator 10b of FIG. 1B in which the separator includes two inclined surfaces 14b forming a "V" shape. If the electrolyte is water based, electrons are added to porous electrode 8b such as a woven wire cylinder through connection 32b and are removed from container 4b through electrical connection 6b to continuously convert hydrogen ions into hydrogen atoms and subsequently diatomic molecules that can nucleate to form bubbles on or near electrode 8b. Hydrogen and oxygen bubbles are typically much less dense than water based electrolytes and are buoyantly propelled upward. Oxygen bubbles are similarly propelled upward and separated from hydrogen by the geometry of coaxial separator 10b as shown in the magnified section view of FIG. 2B. The configuration shown in FIG. 2B may be used in any application in which the flow of gas formed during operation of the electrolytic cell 2b is desirable. Further, said separator configuration may be employed in other configurations of electrochemical cells known in the art. Alternatively, if the materials formed during electrolysis is of a higher density than the electrolyte, separator 10b may be inverted forming a "A" shape. Similarly if one material formed at the cathode by electrolysis is less dense than the electrolyte and another material formed at the anode is more dense that the electrolyte, separator 10b may be comprised of a slanted "/" or "\" shapes to deflect the less dense material away from the more dense material.

Mixing of hydrogen with oxygen that is released from 4b' or the inside of container 4b is prevented by a liquid-permeable barrier, separator 10b which efficiently separates gases by deflection from the surfaces 12b' and 14b which are inclined against oxygen and hydrogen entry, flow, or transmission as shown. Alternatively, separator 10b may include a helical spiral that is composed of an electrically isolated conductor or from inert dielectric material such as 30% glass filled ethylene-chlorotrifluoroethylene in which the cross section of the spiraled strip material is in a "V" configuration as shown to serve as an electrical insulator and gas separator.

Passageways for fluid travel can be increased as desired to meet fluid circulation and distribution needs by corrugating the strip occasionally or continuously particularly at each edge to produce clearance between each layer of the helix, or alternatively at the stack of formed disks that make up the section shown in FIG. 2B as a magnified corrugations as shown at 13b in section view. It is generally advantageous to have each of such corrugations undulate about an appropriately inclined radial axis more or less as shown with respect to axis 15b and 15b'. This allows the overall liquid-porous but gas-barrier wall thickness of separator 10b that is formed to be a desired thickness, for example, about 0.2 mm (0.008") thick or less.

Separator 10b may be of any suitable dimensions including very small dimensions and with respect to surface energy conditions sufficient to allow the liquid electrolyte to pass toward or away from electrode 8b while not allowing passage of gases because of the buoyant propulsion and upward travel of the gas. An alternative embodiment applicable in, for example, relatively small fuel cells and electrolyzers, is provided by a multitude of closely-spaced flattened threads with the cross section shown in FIG. 2B in which such threads are woven or adhered to threads that provide mostly open access of liquids and are disposed in the mostly vertical direction on one or both sides of the "V" shaped threads. This allows the overall liquid-porous but gas-barrier wall thickness of separator 10b that is formed to be about 0.1 mm (0.004") thick or less.

Upward buoyant propulsion deflects gas bubble collisions on the inclined surfaces 12b and 14b. This feature overcomes the difficulties and problems of the prior art conventional approaches that cause inefficiencies due to one or more of electrical resistance, fouling, stagnation, corrosion, and polarization losses. Moreover, some configurations can promote electrolyte circulation in concentric layers due to the buoyant pumping action of rising bubbles that produces flow of electrolyte upward and, as the gas(es) escape at the top of the liquid, the relatively gas-free and denser electrolyte flows toward the bottom as it is recycled to replace the less dense electrolyte mixed with bubbles or including dissolved gas. A heat exchanger 56b may be operated as needed to add or remove heat from electrolyte that is circulated from the top of container 4b to the bottom as shown. Pump 36b may be used as needed to increase the rate of electrolyte circulation or in conjunction with pump 40b to add make up water.

In some embodiments high current densities are applied, including systems with rapid additions of organic material. In such embodiments, it may be advantageous to circulate the electrolyte with pump 36b which returns relatively gas free electrolyte through fitting 28b through line 34b to pump 36b to return to container 4b through line 38b and fitting 16b as shown. It may be preferred to enter returning electrolyte tangentially at fitting 16b to produce a swirling delivery that continues to swirl and thus synergistically enhances the separation including the action by separator 10b that may be utilized as described above. Depending upon the pressure of operation, hydrogen is about fourteen times less dense and more buoyant than the oxygen and tends to be readily directed at higher upward velocity by separator 10b for pressurized collection through filter 48b at fitting 26b. At very high current densities and in instances that electrolytic cell 2b is subjected to tilting or G-forces as might be encountered in transportation applications, the velocity of electrolyte travel is increased by pump 36b to enhance swirl separation and thus prevents gases produced on an anode from mixing with gases produced by a cathode.

Some embodiments of non-conductive gas barrier and liquid transmitting embodiments including separator 10b enable much less expensive and far more rugged and efficient reversible electrolyzers to be manufactured than previous approaches including those that depend upon proton exchange membranes to separate gases such as hydrogen and oxygen. In one aspect, separator 10b can be designed to improve electrolyte flow during electrolysis. For example, separator 10b can be configured to promote the spiral flow of ions in liquid electrolyte inventories traveling upward from port 16b to port 28b. This assures that each portion of the electrodes receives freshly replenished ion densities as needed for maximum electrical efficiency. Such electrode washing action can also rapidly remove bubbles of hydrogen and oxygen as they form on the respective electrodes of the electrochemical cell.

FIG. 3B shows the edge view of representative portions of component sheets or helical strips of another aspect of separator 10b for providing electrical isolation adjacent electrodes including flat plate and concentric electrode structures while achieving gas species separation as described above. In assembly 11b, sheets 12b' and 14b' form a cross section that resembles and serves functionally as that of separator 10b. Flat conductive or non-conductive polymer sheet 12b' is prepared with multitudes of small holes on parallel centerlines that are inclined to form substantial angles such as shown by first angle 15b of approximately 35° to 70° angles with the long axis of sheet 12b' as shown. Polymer sheet 14b' is similarly prepared with multitudes of small holes on parallel centerlines that are substantially inclined as shown by second angle 15b' to form approximately 35° to 70° angles with the long axis of sheet 14b' as shown.

In other embodiments the angles 15b and 15b' can be varied depending on the material to be separated during the electrolysis process. For example the angles could be declined, for electrolysis of compounds that have no gaseous constituent or only one gaseous constituent. If a compound such as $Al_2O_3$ is dissociated by electrolysis in cryolite-alumina electrolyte to form aluminum and oxygen, the aluminum is more dense than the cryolite-alumina electrolyte and the aluminum separating cathode electrode or associated separator would be configured (by, e.g., declined angles) to send the aluminum downward and away from the oxygen traveling upward.

Figure 4B:
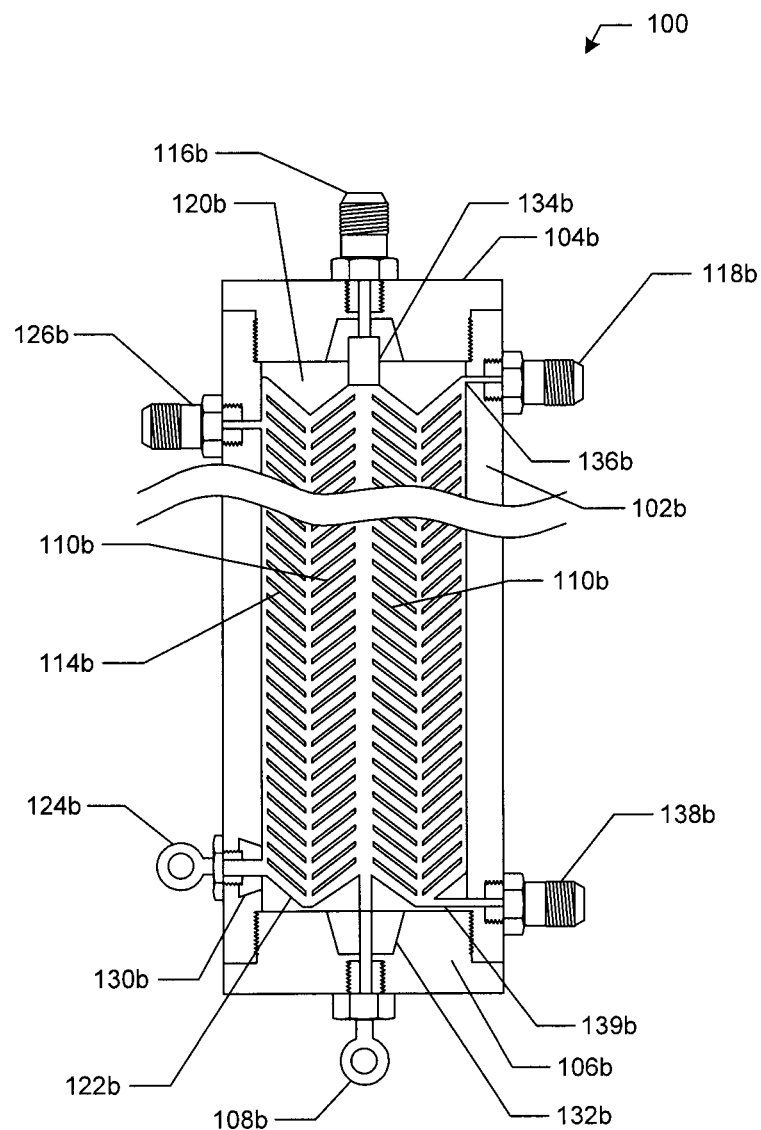
FIG. 4B shows an electrolytic cell in accordance with an embodiment of the present invention.

Multitudes of such small holes with diameters of about $\frac{1}{12}$ to $\frac{1}{3}$ of the sheet thickness dimension can readily be made in sheets 12b' and 14b' by suitable technologies including laser drilling, hot needle piercing, or by high-speed particle penetrations. Sheets 12b' and 14b' each of which are typically about 0.025 to 0.25 mm (0.001" to 0.10") thick can be held together by welding or otherwise bonding, thread ties, elastic bands, or one or more spiral wraps of conductive or nonconductive wire on the resulting outside diameter to form as an assembly with electrode 8b. Sheets 12b' and 14b' may also be joined occasionally or continuously by adhesives or by thermal or solvent fusion. Thus, where the inclined holes of sheet 12b' overlap the holes of sheet 14b' passageways are formed to enable liquid and/or electrolyte travel while prohibiting gas transmission through the gas barrier membrane that is formed. Referring to FIGS. 1B and 4B, tubular constructions of the assembled gas barrier sheets may be formed with the appropriate diameter for embodiments 2b or 100b by adhering or welding the butt seam or by providing an overlapped seam that performs as the intended separation gas barrier.

For electrolysis of water, a variety of electrolytes are suitable. In one embodiment potassium hydroxide may be used with low carbon steel for the containment vessel 4b. Extended life with increased corrosion resistance may be provided by nickel plating cylinder 4b or by utilization of a suitable stainless steel alloy. In other aspects, increased containment capacity can be provided by overwrapping cylinder 4b with high-strength reinforcement such as glass, ceramic, or carbon filaments or a combination thereof.

Depending upon the particular application and strength requirements it may be advantageous to use about 30% glass filled ethylene chlorotrifluoro-ethylene for insulating separators 20b and 24b. Electrode 8b may be made of woven nickel or type 316 stainless steel wires. Separator 10b may be made from about 30% glass filled ethylene-chlorotrifluro-ethylene strip.

In another embodiment, it is also intended to utilize controlled applications of electricity to produce methane or hydrogen separately or in preferred mixtures from organic electrolytes. In some aspects, the embodiment can operate in conjunction with the embodiments of copending patent application including Ser. No. 09/969,860, which is incorporated herein by reference. Anaerobic digestion processes of organic materials that ordinarily produce methane can be controlled to produce an electrolyte that releases hydrogen at considerably lower voltage or by a reduced on-time of a pulse-width modulated duty cycle and resulting electricity expenditure than that required to dissociate water.

Acidity or pH of the organic solution that is produced by microbial digestion can be maintained by a natural bicarbonate buffered interaction. The bicarbonate buffer may be supplemented by co-production of carbon dioxide in the digestion process. The process may be generalized for various steps in anaerobic digestion processes of organic compounds by illustrative digestion of a simple carbohydrate or glucose that may have many competing and complementary process steps such as:

$$C_6H_{12}O_6 + \text{(Anaerobic Acid formers, Facultative bacteria)} \rightarrow CH_3COOH \quad \text{Equation 1}$$

$$CH_3COOH + NH_4HC_6O_3 \rightarrow CH_3COONH_4 + H_2O + CO_2 \quad \text{Equation 2}$$

$$3CH_3COONH_4 + 3H_2O \text{(Bacteria)} \rightarrow 3CH_4 + 3NH_4HCO_3 \quad \text{Equation 3}$$

In instances that methane from such solutions is desired, pH control near 7.0 may be needed. At ambient pressure, pH of about 7.0, and 35-37° C. (99° F.), methanogenesis is favored. Most domestic wastewater contains biowastes with both macro and micronutrients required by the organisms that provide methanogenesis. Maintaining relatively large concentrations of dissolved and distributed hydrogen or monosaccharides present in the anaerobic reactor may inhibit operations of methane-forming microorganisms.

In another aspect, increased production of fuel values from organic substances can be accomplished by application of an electric field to cause dissociation of substances such as acetic acid ($CH_3COOH$) that are produced by bacterial breakdown of glucose and other organic compounds and by other acid-production processes that yield hydrogen ions.

$$CH_3COOH \rightarrow CH_3COO^- + H^+ \quad \text{Equation 4}$$

Hydrogen ions migrate or are delivered to the negatively charged electrode and gain electrons to produce hydrogen gas.

$$2H^+ + 2e^- \rightarrow H_2 \quad \text{Equation 5}$$

Two electrons are supplied by the negatively charged electrode. At the other electrode the electrochemical reaction includes oxidation of the acetate ion to carbon dioxide and hydrogen ions as summarized in Equation 6.

$$CH_3COO^- + 2H_2O \rightarrow 2CO_2 + 7H^+ + \text{Electrons} \quad \text{Equation 6}$$

In this electrode reaction, acetate ions lose electrons, subsequently react with the water and break up into carbon dioxide gas and hydrogen ions. Carbon dioxide saturates the solution and is released from the liquid solution interface as set forth in the above embodiments. Hydrogen ions are circulated and/or migrate until electrons are received from the opposite electrode to produce hydrogen atoms and then diatomic molecules as summarized in Equation 5 for separate co-collection in such systems. Separated collection is highly advantageous, for example, separated collection to cause pressurization or at high pressure as a result of liquid pumping instead of gas compression, is especially efficient and greatly reduces the capital equipment ordinarily required to separate and then mechanically compress the hydrogen, methane or carbon dioxide produced.

Decomposition by anaerobic digestion of compounds such as acetic acid to produce hydrogen and carbon dioxide requires much less energy than electrolysis of water, because, in part, the digestion reactions yield hydrogen ions and exothermic energy. Initialization and maintenance of the exothermic decomposition of acids such as acetic acid may be accomplished at lower voltage applications or by intermittent or occasional electrolysis instead of continuous electrolysis as typically required to decompose water. The free energy of formation of water at ambient temperature is quite large (at least 1 KWH=3,412 BTU of released hydrogen) compared to the electrolysis of digester substances and acids such as urea and acetic acid to hydrogen and carbon dioxide, which requires relatively minimal activation and/or catalytic action particularly by organic catalysts. Accordingly, selected catalysts including modifications to Raney-Nickel catalysts, nickel-tin-aluminum alloys, selections from the platinum metal group, platinum-nickel and other platinum-transition metal single crystal alloy surfaces, and various organic catalysts utilized in conjunction with the electrode systems set forth herein further improve the rate and/or efficiency of hydrogen production.

In another aspect, it may be preferred to utilize numerous cells of electrode pairs connected in switchable series or parallel or series-parallel for purposes of matching the available source amperage and voltage with the voltage required for dissociation by series connection of cells such as shown in FIG. 1B. In one aspect of this embodiment, each cell may require about 0.2 to 2 volts depending upon the aqueous electrolyte chosen or biochemically produced from organic substances so a home-size 6-volt photovoltaic source could have 3 to 30 cells in series and an industrial 220-volt service may have about 100 to 1,000 electrode cells connected in series. Product gases could readily be delivered by parallel or series collection arrangements. Depending upon the desired flexibility for adjusting the number of series and/or parallel connections, support and flow control feature 18b may be by an insulating or non-insulating material selection.

At various current densities, including at medium and low current densities, it may be preferred to allow buoyant propulsion of the bubbles that are generated to accomplish circulation of the electrolyte to prevent ion depletion and stagnation problems. At start-up or higher current densities one can operate pump 36b and heat exchanger 56b to provide the desired operating temperature and presentation of ion-rich electrolyte at the electrode surfaces. This enables extremely high rates of energy conversion in which energy such as off-peak electricity available from solar, wind, falling water, or wave resources is utilized to quickly and efficiently produce high-pressure supplies of oxygen and hydrogen or hydrogen and carbon dioxide or hydrogen and methane along with carbon dioxide for separated storage and use.

In one aspect of this embodiment, the problem of regenerative braking of vehicles or power-plant spin-down in which sudden bursts of large amounts of energy must be quickly converted into chemical fuel potential is addressed. A conventional fuel cell for truck, bus, or train propulsion cannot tolerate high current densities that are suddenly applied to the fuel cell electrodes. This embodiment overcomes this limitation and provides extremely rugged tolerance of high current conditions while achieving high electrolysis efficiency without the problems of PEM degradation or electrode-interface failures that regenerative PEM fuel cells suffer. Because of the rugged construction and extremely ample opportunities for cooling that are provided, extremely high current operations are readily accommodated. Conversely, this embodiment readily starts up and operates efficiently in severe cold or hot conditions without regard for various PEM-related difficulties, limitations, and failures.

In another aspect, in order to achieve much higher return on investment in energy conversion systems such as a hydroelectric generating station, wind farm, system of wave generators, or conventional power plants, the embodiment allows off-peak electricity to be quickly and efficiently converted into hydrogen and oxygen by dissociation of water or hydrogen and carbon dioxide by dissociation of substances generated by anaerobic digestion or degradation of organic matter. A compact version of the embodiment can occupy a space no larger than a washing machine and convert off-peak electricity that might otherwise go to waste into enough hydrogen to operate two family size vehicles and provide the energy requirements of the home.

As set forth above, some embodiments provided herein provide more efficient mass transport including rapid ion replenishment processes and deliveries to desired electrodes by pumping actions of low-density gases escaping from denser liquid medium. This assures greater electrical efficiency, more rapid dissociation, and greater separation efficiency along with prevention of undesirable side reactions. Increasing the rate and efficiency of ion production and delivery to electrodes increases the system efficiency and current limit per electrode area. Applications that convert organic substances into carbon dioxide and hydrogen or methane are particularly benefited by: enhanced rates of delivery of organic substances to microorganisms that participate in the process, incubation and delivery of incubated microorganisms to extend and self-repair biofilm media, more rapid separation of produced gases and delivery of organic substances along with more efficient delivery of intermediate ions to electrodes.

Referring to FIG. 4B, another embodiment, electrolytic cell 100b is shown that is particularly beneficial in applications in which it is not desired to apply voltage or to pass current through the inside walls of containment vessel 102b. The embodiment also facilitates series connections of bipolar or multiple electrode sets or cells such as 110b and 114b within the electrolytic cell 100b to simplify gas collection and voltage matching needs.

In one aspect in which that containment vessel 102b is cylindrical and the components within are concentric, electrode assemblies 110b and 114b may be formed from numerous nested truncated conical components or one or both electrodes may be formed as a helical electrode as described above. Electrodes 110b and 114b may be of the same, similar or different configurations. In another aspect, electrode 114b may be assembled from nested truncated conical sections or it may be a spiral electrode that continuously encircles electrode 110b.

Figure 5B:
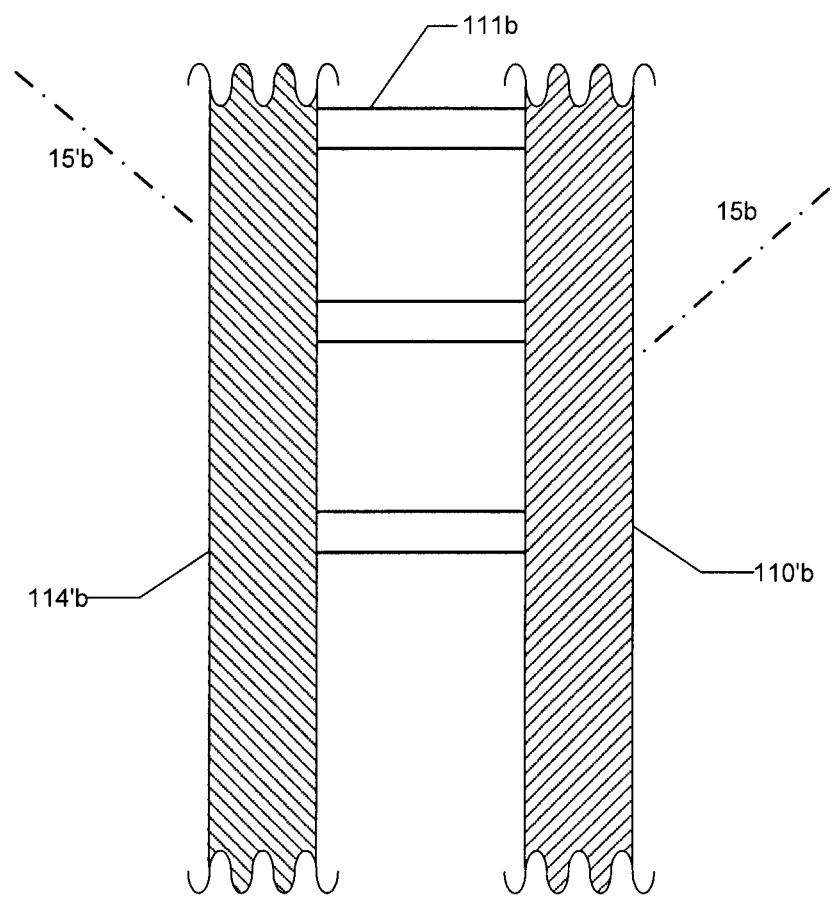
FIG. 5B a magnified view of an alternative embodiment for a portion of electrolytic cell of FIG. 4.

Electrical separation of electrodes 110b and 114b to prevent short circuits may be accomplished by various means including by controlled tolerances for the operating dimensions and/or by the use of dielectric threads or filaments placed between electrodes 110b and 114b and/or by another form of separator 10b or 111b as disclosed regarding FIGS. 2B and 5B.

The electrolytic cell 100b may be pressurized. Pressure containment is provided by upper and lower caps 104b and 106b as shown. Insulators 120b and 122b are supported by caps 104b and 106b as shown. The circuit components and hardware for electrical and fluid connections are illustrative and can be accomplished by penetrations through caps 104b and 106b as needed to meet specific application needs.

In the current embodiment, both electrodes 110b and 114b are formed to have inclined surfaces that direct the substance produced such as gas released to respective collection zones as shown. Illustratively, if water is to be dissociated from a suitable electrolyte, electrode 110b may receive electrons that are supplied through connection 108b, which is sealed in cap 106b by plug seal 132b. Electrons are thus taken from electrode 114b through plug seal 130b, which provides insulation of contact 124b as a gas such as carbon dioxide or oxygen is released on electrode 114b.

Such gases are thus propelled by buoyant forces and travel more or less upward as delivered by electrode 114b and along the inside wall of container 102b. Hydrogen is propelled upward as delivered by electrode 110b and within the center core formed by numerous turns or conical layers of electrode 110b and collected as shown at insulator 120b. Purified hydrogen at design pressure is delivered by pressure fitting 116b. Catalytic filter 134b may be used to convert any oxidant such as oxygen that reaches the central core to form water. A similar catalytic filter material may be used to produce water from any hydrogen that reaches the outer collection annulus in insulator 120b as shown. Pressurized filtered oxygen is delivered by pressure fitting 118b.

Optionally, to improve the efficiency of the electrolytic cell 100b, one or more gas collection vessels (not shown) may be in fluid communication with electrolytic cell 100b to collect gas formed during electrolysis. The gas collection vessel can be implemented to capture the gas at an elevated pressure prior to substantial expansion of the gas. The gas collection vessel can be further configured to capture work as the gas expands according to methods known in the art. Alternatively, the gas collection vessel can be configured to provide gas at pressure for storage, transport or use wherein the gas is desired to be delivered at an elevated pressure. It is further contemplated that said aspect can be implemented in various electrochemical cells.

Referring to FIG. 2B, in another aspect, a gas expander may be included at, near or inside fitting 22b, fitting 26b or in a gas collection vessel in fluid communication with fitting 22b or fitting 26b. Similarly, referring to FIG. 4B, a gas expander may be included at, near or inside fitting 116b, 118b or in a gas collection vessel in fluid communication with fitting 116b or fitting 118b.

In another aspect, a method and apparatus for electrolysis to pressurize a fluid coupled with a device to extract work from such pressurized fluid is provided. The fluid may be pressurized liquid, liquid-absorbed gas, vapor or gas. Conversion of pressurized fluid to vapor or gas may occur in or after fitting 116b and a device to convert the pressure and flow from such fittings could be selected from a group including a turbine, generator, vane motor, or various piston motors or an engine that breathes air and injects pressurized hydrogen from 116b. Similarly conversion of pressurized fluid to vapor or gas could be in or after fitting 118b and a device to convert the pressure and flow from such fittings could be selected from a group including a turbine, generator, vane motor, or various piston motors or an engine that expands and/or combusts pressurized fluid such as oxygen from 118b.

In another aspect, an apparatus and method to overcome the high cost and power losses of a transformer and rectifier circuit is provided. This is accomplished by adjusted matching of load voltage with source voltage by series connection of electrode cells or electrodes within a cell, such as connecting the negative polarity of a DC source to the lowest three turns of electrode 110*b* to the next three turns of electrode 114*b* to the next three turns of electrode 110*b* to the next three turns of electrode 114*b* and to the next three turns of electrode 110*b* et seq. and starting from the opposite (highest) end to connect the positive lead from the DC source to three turns of electrode 114*b* to the next three turns of electrode 110*b* to the next three turns of electrode 114*b* to the next three turns of electrode 110*b* to the next three turns of electrode 114*b* et seq. Turns and/or stacks of truncated cones may be adjusted to develop the area needed to match the source amperage.

In another aspect of this embodiment, in addition to providing separation of the gases produced by electrolysis, the pumping action developed by the some embodiments of the invention provides for delivery of nutrients to microorganisms that, depending upon the relative scale of operations, are hosted in suitable media such as carbon cloth, activated carbon granules, expanded silica, graphite felt, coal, charcoal, fruit pits, wood chips, shredded paper, saw dust, and/or mixtures of such selections that are generally located within portions of electrode 110*b* and/or between portions of electrode 114*b* and container 102*b*. Corresponding functions and benefits include thermal stabilization of the system, circulation of feedstocks and removal of products such as carbon dioxide and production of hydrogen from acids that may be produced by the incubation, nutrition, and growth of such microorganisms.

At low and medium current densities, buoyant forces induced by low density solutions and bubbles can circulate the electrolyte within container 102*b*. At higher current densities it is advantageous to adaptively control temperature, pressure, and circulation of the electrolyte as previously disclosed. External circulation of electrolyte may be from fitting 126*b* to fitting 138*b* as shown and includes situations in which one or numerous electrode cells connected in optional series and/or series-parallel circuits are contained within container 102*b*.

In another aspect, the embodiment can be optimized for high current densities to deliver commensurately higher electrolyte fluid flow rates through one or more holes or grooves 139*b*, which direct fluid at a tangent to the annular space between electrodes 110*b* and 114*b*. Electrolyte flows upward along the helical spaces formed by the electrodes and is replenished by electrolyte entering helical paths provided by 110*b* and 114*b* from the annular space between 110*b* and 114*b*. The angular momentum of the electrolyte entering the space between electrodes 110*b* and 114*b* increases the impetus of bubble lift pumping by electrolytic products such as hydrogen and oxygen respectively produced on electrodes 110*b* and 114*b* and adds to such momentum.

This circulation of electrolyte is highly beneficial for purposes of assuring rapid replacement of ions that become hydrogen and oxygen atoms or other gases such as carbon dioxide upon charge exchanges to and from electrodes 110*b* and 114*b* and for removing such gases for collection and removal with minimum electrical polarization loss during electrolysis. Thus very high current densities are readily accepted to efficiently electrolyze the circulated fluid. In another aspect, further accommodation of high current densities is provided by the vast cooling capacity of the design resulting from improved electrolyte circulation, which prevents harmful stagnation of products of electrolysis and/or phase changes such as steam nucleation, and reduction of effective electrode areas.

In another aspect, electrodes 110*b* and 114*b* may constitute spring forms that can be advantageously operated at a resonant frequency or perturbed by various inducements including piezoelectric drivers, rotating eccentrics, and the action of bubble formation and the acceleration thrust by less-dense mixtures of electrolyte and bubbles as higher density electrolyte inventories are delivered to the surfaces of electrodes 110*b* and 114*b* by the pumping action that results. In response to perturbation, electrodes 110*b* and 114*b* vibrate at natural or induced frequencies to further enhance dislodgement of bubbles from surfaces including nucleation sites and thus enable higher current densities and greater energy-conversion efficiency.

Induced vibration of helical spring-form electrodes such as 110*b* and 114*b* can also cause peristaltic mechanical action to enhance bubble acceleration toward the respective collection paths and exit ports of electrolytic cell 100*b*. During this vibration, cyclic increases and decreases of the average distance and angle between adjacent layers of electrode turns produce fixed or traveling nodes depending upon the magnitude and frequency of the inducement(s).

FIG. 5B shows a representative section view of a set of electrodes 110*b*' and 114*b*' for operation in conjunction with an electrically insulative spacer 111*b* between 110*b*' and 114*b*' including selections such as insulator 10*b* shown in FIG. 2B that includes a helical flow delivery configuration for various applications or electrolytes. The assembly of concentric electrode 110*b*', spacer 111*b*, and electrode 114*b*' provides a very rugged, self-reinforcing system for enabling efficient dissociation of fluids such as water, liquors from anaerobic digesters, or seawater with improved efficiency and resistance to fouling. Electrodes 110*b*' and 114*b*' may be constructed from conductive carbon papers, cloth, or felt; woven or felt carbon and metal filaments, graphite granules sandwiched between woven carbon or metal filaments; or metal-plated polymers or metallic sheet stocks such as mild steel, nickel plated steel, or stainless steel that are drilled more or less as previously disclosed with multitudes of holes on parallel centerlines that are inclined as shown for respective separations of hydrogen from co-produced gases such as oxygen, chlorine, or carbon dioxide depending upon the chemical make up of the electrolyte.

In instances that electrode 110*b*', spacer 111*b*, and electrode 114*b*' are utilized in concentric electrode deployments such as shown in FIG. 4B, hydrogen is delivered to port 116*b* and depending upon the substance undergoing dissociation, products such as oxygen, chlorine or carbon dioxide delivery is provided at port 118*b*. In some instances it is preferred to provide the multitude of holes in 110*b*' and 114*b*' such that each hole is slightly tapered from the hole diameter on surface contacting spacer 111*b* to a larger diameter at the exit surface away from spacer 111*b*.

It is preferred to select the helical pitch, width between electrodes, and thickness of the strip comprising spacer 111*b* for delivery of electrolyte from 138*b* to and through electrodes 110*b*' and 114*b*' to fitting 126*b* at rates that are commensurate with the electrical power available and the system heat transfer requirements to optimize the resulting width space between electrodes. This results in abundant deliveries of ions for electrolysis processes at electrodes 110*b*' and 114*b*' while assuring separation of hydrogen to the zone within electrode 110*b*' and delivery of co-produced gases such as oxygen, carbon dioxide, or chlorine to the space outside of electrode 114*b*'.

In another aspect, it is possible to operate the system regeneratively by providing gas flow grooves in the hydrogen electrode and gas flow grooves in the oxygen electrode along with appropriate fittings for adding hydrogen to the bottom of the hydrogen electrode and oxygen at the bottom of the oxygen electrode. In this case it may be advantageous to utilize concentric spiral electrodes particularly in small fuel cells where a single canister assembly meets energy needs.

Figure 6B:
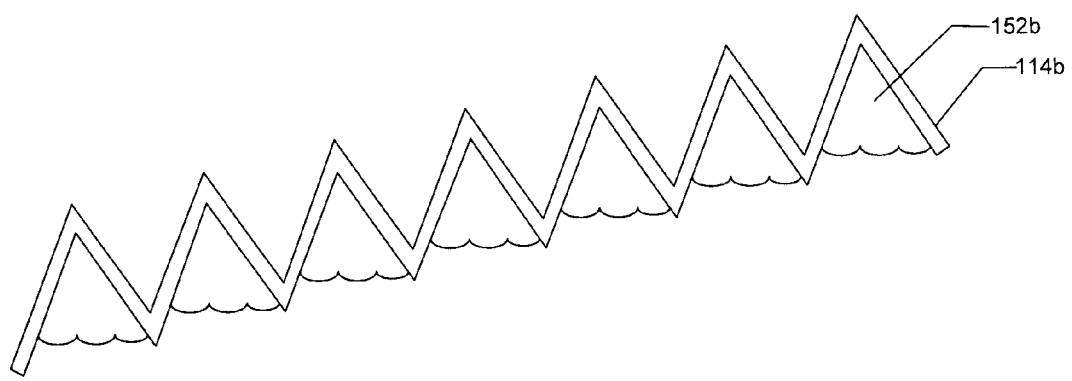
FIG. 6B shows a cross-section of a spiral electrode for use in a reversible fuel-cell.

Referring to FIG. 6B, a cross-section of a spiral electrode(s) for use in instances that reversible fuel-cell operation is shown. This provides improvement of the surface to volume ratio, section modulus, and column stability of electrode 114b or of a similar helical version of electrode 110b. Electrode 114b is illustrated in the section with gas 152b flowing along spiral grooves formed by corrugating the strip stock that is used to form the spiral and provide delivery of oxygen for fuel-cell operation and in electrolysis operation to deliver oxygen to annulus 136b and fitting 118b. The same configuration works well for electrode 110b in fuel-cell and electrolysis modes for conversion of organic acids into carbon dioxide and hydrogen and in the electrolysis mode and assures plentiful gas delivery to the desired collection or source ports as previously described.

In another aspect, improved electrode performance is provided by facilitating the growth and maintenance of microorganisms that convert aqueous derivatives of organic substances such as carbonic, acetic, butyric and lactic acids along with compounds such as urea into hydrogen. On the electrode chosen for production of hydrogen ions and/or the release of carbon dioxide, increased microbe productivity is facilitated by preparing such electrode surfaces with topographical enhancements that increase the effective surface area including high aspect ratio filaments or whiskers that reduce electrical resistance to the substrate electrode and help hold microbes and biofilm in place along with the desired film substances provided by digestive processes.

Without being limited by theory, it is believed that the specific features of the electrode and/or separator, such as the topographical treatments or enhancement, promote turbulence, including cavitation or super cavitation, of the electrolyte at a desired location which in turn promotes nucleation at the location. Conversely, the specific configuration of the electrode and/or separator can inhibit turbulence, including cavitation or super cavitation at a desired location, for example, the point of electron transfer, which in turn inhibits nucleation at that location. It is contemplated that elements including these features can be implemented at any location in the electrolytic cell at which nucleation is desired. Moreover these same features and principles can be applied to a gas collection vessel or similar in fluid communication with the electrolytic cell, or to fluid communication with passages or valves there between.

Suitable filaments and or whiskers include metals or doped semiconductors such as carbon, silicon or nano-diameter filaments of carbon or boron nitride to provide increased surface area, reduce ion-transport and ohmic loses, increased microbe productivity and more effective nucleation activation for more efficient carbon dioxide release. Such filaments may also be utilized to anchor graphite granules that further improve microbe productivity, enhanced efficiency of enzyme and catalyst utilization, and related beneficial hydrogen ion production processes. Similarly, at the electrode where hydrogen ions are provided with electrons to produce hydrogen atoms and nucleate bubbles of diatomic hydrogen, filaments and whiskers may be utilized to increase the active area and reduce the voltage required for the overall process.

In addition to carbon whiskers, filaments grown from metals such as tin, zinc, nickel, and refractory metals deposited from vapor or grown from plating on suitable substrates such as iron alloy electrodes, have been found to provide reduced electrical resistance and improved process efficiency. Such filaments or whiskers may be made more suitable for biofilm support and process enhancement by addition of conducive surfactants and or surface plating with suitable substances such as carbon, boron nitride, or silicon carbide deposited by sputtering or from decomposition of a substance such as a carbon donor from illustrative precursors such as acetylene, benzene, or paraffinic gases including methane, ethane, propane, and butane.

The embodiment of FIG. 4B and variation thereof can provide advantageous separation of low density gaseous derivatives of fluid dissociation including hydrogen separation from organic liquors as summarized in Equations 1-6 to deliver hydrogen or selections of hydrogen-enriched mixtures to port 116b while carbon dioxide or carbon dioxide enriched mixtures including fixed nitrogen components are delivered to port 118b. In some applications it may be desirable to reverse the polarity of these electrodes to reverse the delivery ports for gases that are separated. Such reversals may be long term or intermittent to accomplish various purposes. Depending upon selections of helical pitch(es) of electrodes 110b and 114b and each electrode's resonant or imposed frequency of vibration, and the relative fluid velocity at each electrode, hydrogen may be delivered to port 116b but the system may be operated to include methane and carbon dioxide. However, carbon dioxide delivered to port 118b may include methane and other gases of greater density than hydrogen. In applications that it is desired to provide Hy-Boost mixtures of hydrogen and methane to enable unthrottled operation of internal combustion engines, various burners, furnaces or fuel cells, the embodiment of FIG. 4B operating with hydraulic and electrical circuit control provisions such as provided by pump 36b and controller 52b, facilitates the option of producing and separating desired fuel mixtures with controlled ratios of hydrogen and methane for delivery at port 116b.

An unexpected but particularly beneficial arrangement for production of vigorous anaerobic colonies of microbes that produce the desired conversion of organic feedstocks to hydrogen and/or methane is provided by adding media such as colloidal carbon, carbon filaments including nanostructures, exfoliated carbon crystals, graphene platelets, activated carbon, zeolites, ceramics and or boron nitride granules to the electrochemical cell. Such media may be doped or compounded with various agents to provide enhanced catalytic productivity. Illustratively, desirable functionality may be provided by doping with selected agents having electron structures more or less like boron, nitrogen, manganese, sulfur, arsenic, selenium, silicon, tellurium, and or phosphorous. Circulation induced by the gases released by the electrolysis process can promote sorting of such media into advantageous locations and densities for more efficient charge current utilization.

Without being limited to a particular theory, it is hypothesized that such synergistic results relate to increased surface areas in critical locations and development of stringers, regions, or filaments that enhance nucleation processes and or conduct electrons or hydrogen ions along with advantageous adsorption of enzymes, hydrogen, methane or carbon dioxide in biofilms and reaction zones that result. It is also indicated that microbes are incubated for circulation to efficiently utilized locations in the operations performed and flow paths produced in various embodiments disclosed herein.

In addition to whiskers and filaments such as carbon, graphite, various metal carbides, and silicon carbide and other inorganic substances and particles that catalytically enhance performance, it is beneficial to utilize activated substances and particles that present desired nutrients or catalysts to assist microbial processes. Illustratively, porous and/or exfoliated substrates of polymers, ceramics or activated carbon may adsorb conductive organic catalysts such as co-tetramethoxyphenylporphirine (CoTMPP) or poly(3,4-ethylenedioxythiophene) (PEDOT) and or favorably orient and present other catalytic substances including enzymes and graft polymers that may also be utilized to incorporate and present catalytic substances including additional enzymes.

Suitable substances or graft polymers may include those of conventional, dendrimers, fiberforms, and other organic functional materials to minimize or replace platinum and other expensive catalysts and conductors. Such replacement substances and their utilization includes mixtures or staged locations with respect to the fluid circulation resulting from some embodiments disclosed herein. Variously specialized conductive and or catalytic structures include acicular deposits and fibers that may be grown or attached to the electrodes 4b, 8b, 110b, or 114b and/or to overlaid carbon felts or woven structures or dispersed into developing biofilms. Illustratively, conductive and/or catalytic functionalities may be provided by filaments that retain and present hydrogenase and other enzymes, CoTMPP and or other catalysts such as poly (3,4-ethylenedioxythiophene) (PEDOT) as fibers that are synthesized from aqueous surfactant solutions as self-organized thin-diameter, nanofibers with an aspect ratio of more than 100 and provide low resistance to charge conductivity. Synthesis in aqueous solutions including anionic surfactant sodium dodecyl sulfate (SDS) can be adapted to produce various configurations by changing the concentrations of SDS and furthermore by adding $FeCl_3$ to produce polymerized structures. (An exemplary procedure is described in Moon Gyu Han et al., Facile Synthesis of Poly(3,4-ethylenedioxythiophene) (PEDOT) Nanofibers from an Aqueous Surfactant Solution, Small 2, No. 10, 1164-69 (2006), incorporated herein by reference.) Other examples include functional catalysts and micro-conductors in the form of nanocomposites derived from cellulose nanofibers and semiconducting conjugated polymers including polyaniline (PANI) and a poly (p-phenylene ethynylene) (PPE) derivative with quaternary ammonium side chains. Cellulose, carbon, or ceramic whiskers with anionic surface charges can be combined with positively charged conjugated polymers to form stable dispersions that can be solution cast from polar solvents such as formic acid.

Preparations include graft polymers and end caps of organometallic alkoxides, metal alkyls and application of the catalytic benefits of acetic acid and a polymeric catalyst containing COOH end group. Special function and bifunctional end groups along with mixtures of end groups may be chosen to produce multi-functional characteristics including catalytic functions, reactive stabilizers, grafting agents, and promoters of dispersion polymerization. Similarly, specialized activation of carbon or other substrates by hydrogen and or enzymes produced by anaerobic microorganisms provides a locally hydrogen-rich environment to enhance or depress methane production and enhance additional hydrogen production from various organic substances.

Referring to FIGS. 1B-3B, optionally it may be advantageous to provide one or more supplemental felts and or woven screens of carbon filaments to the outside and inside surfaces of cylindrical components 8b, 10b, 11b, 110b, and/or 114b. Such supplemental felts and or woven screens may commensurately collect or distribute electrons in conjunction with electrodes 4b, 8b, 110b, and or 114b and or separators 10b or 11b and help anchor or preferentially locate granules, filaments, and or other structures to reduce pressure losses or more equally distribute liquor flows and facilitate microbial functions in the desired energy conversion operations.

Among the complementary and competing reactions and processes to provide net production of hydrogen and carbon dioxide are various steps of processes summarized in Equation 8.

$$Carbon + 2H_2O \rightarrow CO_2 + 4H^+ + 4Electrons \qquad \text{Equation 8}$$

Carbon is consumed as summarized in Equation 8 including carbon that may be supplied as a constituent or a carbonaceous substance mixed with liquor from an anaerobic digester or electrolyzer or as a result of various manufacturing outcomes. Illustratively, carbon may include scrap from grinding, machining, electro-discharge-machining (EDM), and various thermochemical operations to produce electrodes, electrode coatings on electrodes including tank liners, or particles, or filaments, or flocculants, or selected carbides by thermal dissociation and reaction processes, including colloidal or other suspensions as an outcome of various degrees of dehydrogenization of organic substances.

Such carbon and/or carbon-donor feedstocks may be renewably supplied by bacteria, phytoplankton, or larger algae that receive carbon dioxide and other nutrients from the liquor supplied or by circulation of carbon dioxide to hydroponic and or soil-supported plants. It is advantageous to utilize such forms of carbon with high surface to volume ratios and to provide a voltage gradient to zones where they are delivered for the purpose of driving the reaction indicated and for delivering hydrogen ions to electrode surfaces including complementary conductive media such as filaments and conductive filter substances for production, nucleation, and release of hydrogen bubbles to increase the overall rate of hydrogen production.

Suitable provisions for increasing active surfaces and or flocculants include those with organic constituents such as bacteria, proteins, simple and complex sugars, cellulose, thermally dissociated cellulose, live and dissociated phytoplankton along with various forms of colloidal carbons, activated carbons, and carbides. Illustratively, phytoplankton and or larger algae may be grown, dried, mixed with a binder such as corn syrup, thermally dehydrogenated to various extents and milled to provide finely divided flocculants. Alternatively, activated carbon feedstocks may be milled to provide finely divided particles that are utilized as enzyme receivers or flocculent media or it may be used in conjunction with the previously disclosed substances to enhance the desired production or efficiency of enzymes, to support incubation of desired microorganisms, or to increase hydrogen or methane production and or consumption of carbon to produce hydrogen ions for electrolysis as indicated by Equation 8.

If needed, occasional use of salt water or additions of small amounts of salt to water-based electrolytes can produce chlorine to quickly disinfect or to prevent harmful fouling of the electrolyzer systems shown. Utilization of some embodiments, for example FIG. 5B, enables the resulting system to be inherently free of harmful fouling even when utilizing electrolytes such as wastewater, commercial process water, wood-ash water, sea water, fly-ash water, canal and ditch water, or anaerobic digester liquor. Further, such systems can be quickly cleaned if needed by backflow of electrolyte or cleaning water from fitting 118b to 138b to dislodge particles that may have been delivered to the electrodes.

Applications of some embodiments include large community waste disposal operations to nano-size electrolyzers, include improvements to conventional waste digesters from which solutions or "liquor" containing organic substances is supplied for production of hydrogen and/or methane and or carbon dioxide and other plant nutrients. In this capacity some embodiments can provide rapid and efficient conversion of byproducts produced by anaerobic digesters and convert hydrogen ions into hydrogen and overcome acid degradation of the methane production operations. In operation, liquor from an anaerobic digester is utilized to produce hydrogen and carbon dioxide to provide beneficial restoration and or maintenance of pH near 7.0 instead of more acidic conditions that may stymie methane production systems. This enables increased overall energy conversion efficiency as it overcomes the requirement for expensive provisions for addition of chemical agents to adjust the pH in digesters. In such medium and large applications it is beneficial to design and engineer multifunctional components including electron distribution circuits that may also provide desired retention of granules such as carbon, boron nitride, zeolites, polymers, and ceramics including such substances in variously activated conditions for enhanced performance.

In another aspect, an electrolyzer such as disclosed herein may be applied to provide rapid conversion of acids that are typically produced by anaerobic digestion including applications with municipal waste water and landfills along with wastes form slaughter houses, dairies, egg farms, and other animal feeding centers or similar. Production of methane is slowed or inhibited if acids that are produced by anaerobic conditions cause the pH to fall much below 7. Such acids can form if the feed rate of organic material exceeds the capacity of the methanogenic colony of microorganisms. By extracting hydrogen from such acids the rate of organic material processing by anaerobic digestion can be increased. The combination of methane and hydrogen provides much greater net energy production per ton of wastes, and the wastes are processed faster to increase the capacity of the process.

A particularly useful embodiment of the some embodiments is in waste-to-energy applications that utilize organic substances such as sewage along with hydrolyzed garbage, farm wastes, and forest slash in the anaerobic electro-digestion process summarized in Equations 1-6 to produce hydrogen with minimal or no oxygen production. The rugged configuration and recirculation operations enable great tolerance for dissolved solids including organic solids and particles in anaerobic process liquors that are utilized as electrolytes. Production of hydrogen without commensurate release of oxygen as would be released by electrolysis of water facilitates higher efficiency and safety for utilization of the waste-sourced hydrogen as a cooling gas in electrical equipment such as an electricity generator.

Figure 7B:
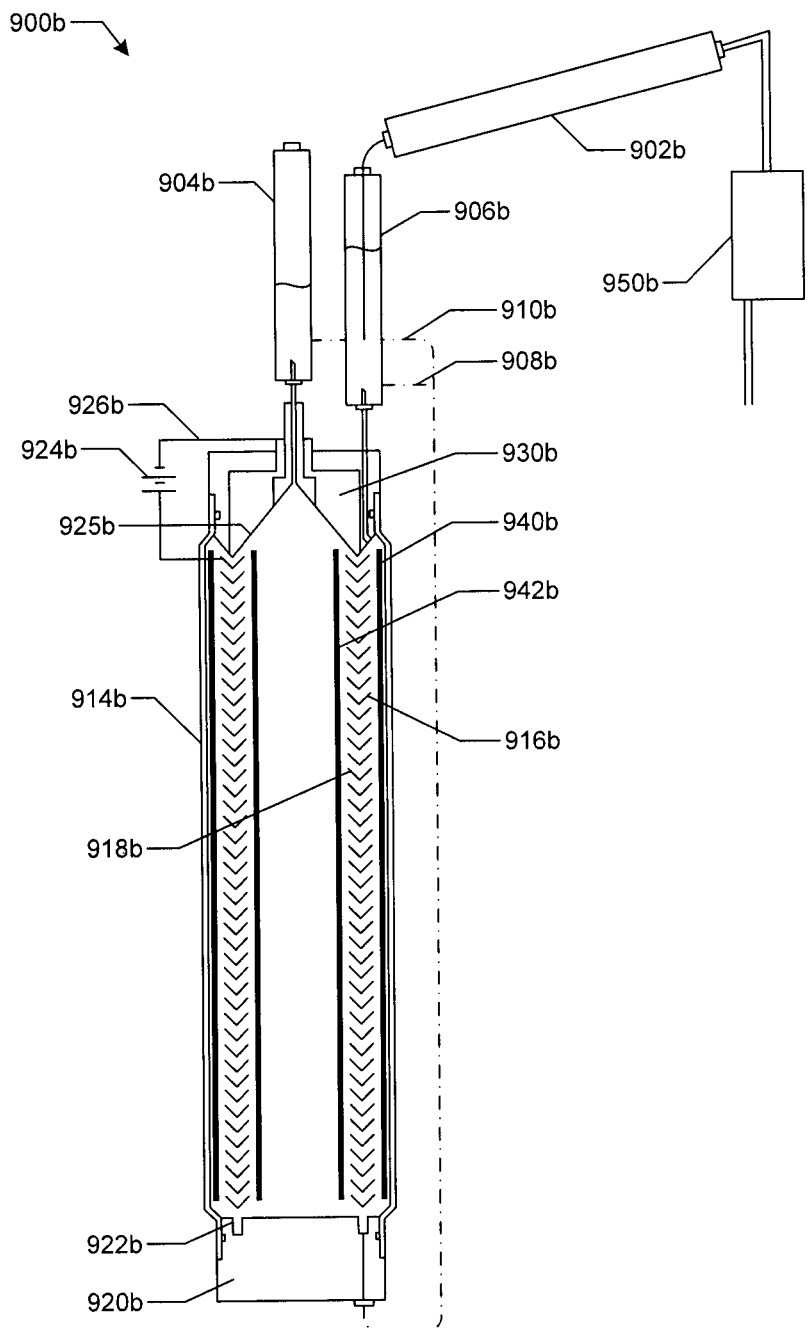
FIG. 7B shows a system for converting organic feedstocks such as those produced by photosynthesis into methane, hydrogen, and or carbon dioxide.

In another application of some embodiments disclosed herein, electrolyzer system $900b$ as shown in FIG. 7B provides for tissue and/or cellular disruption of biomass by enzyme, mechanical, thermal, acoustic, electrical, pressure and/or chemical actions and processes in conditioner $950b$ to enable faster or more complete processing, digestion and/or support of incubator purposes. Fluid including such disrupted cells from conditioner $950b$ and related feedstocks that are produced by converter $902b$ is circulated to electrolyzer $914b$ through annular distributor $922b$ of base $910b$ as shown. Anaerobic microorganisms are supported by media $940b$ and $942b$ and receive liquid recirculated from hydrogen separator $904b$ through conduit $910b$ and liquid recirculated from carbon dioxide separator $906b$ through conduit $908b$ as shown. Electrode $918b$ and/or media $942b$ releases hydrogen and electrode $916b$ and/or media $940b$ releases carbon dioxide. Electromotive bias is provided to electrodes $916b$ and $918b$ through circuit $926b$ by source $924b$ which may range from 0.1 to about 3 VDC depending upon the compound dissociation requirement and occasional needs for increased voltage to overcome insulating films that form. Hydrogen is ducted to collection and delivery to separator $904b$ by travel along the more or less conical surface $925b$, which may be a conductive surface depending upon the desired series/parallel variations or contained and supported by insulator $930b$ as shown.

In operation, liquors are mingled in distributor annulus $922b$ and travel upwards to provide process reactants and nutrients to microorganisms hosted in activated carbon cloth and/or granules $940b$ and $942b$ and or conductive felts that encase and substantially retain such granules proximate to electrode $916b$ and or $918b$. Smaller particles and filaments may be added to infiltrate locations throughout the electrolyzer system to enhance electrical charge conductivity, enzyme, and catalytic functions including those previously disclosed. Separator $902b$ may be a reverse osmosis membrane or a cation or anion exchange membrane or it may be constructed according to the embodiments shown in FIG. 2B, 3B, 4B, or 5B and in some instances such separators may be used in conjunction with each other as may be desired to provide for various liquor circulation pathways and/or to produce hydrogen and carbon dioxide at different pressures or with a pressure differential between hydrogen and carbon dioxide.

Similarly, numerous circulation options are available if electrode $916b$ along with adjacent felt and or media $940b$ operate as electron sources to produce hydrogen from ions delivered from liquors that are circulated by the action of gas production lifts, convection currents, or by pump deliveries as shown. In this option, carbon dioxide is released as hydrogen ions are produced from acids delivered from $902b$ and $950b$ or that are produced by microorganisms hosted in fibrous or granular media $942b$ and associated felt materials that are electrically biased by electrode $918b$ to be opposite to electrode $916b$ as shown. Another exemplary option results if electrons are supplied by electrode $918b$ to produce hydrogen that is collected by insulator $930b$ for delivery to gas collector $904b$ as shown. In this instance electrode $916b$ and the media electrically associated with it are electron collectors as carbon dioxide is released to provide pumping in the fluid circuit shown as carbon dioxide is delivered past insulator $930b$ to collector $906b$ as shown.

Referring to FIG. 7B, system $900b$ can be used for converting organic feedstocks such as those produced by photosynthesis into methane, hydrogen, and/or carbon dioxide and/or by microorganisms. Depending upon the microorganisms that are hosted, liquors that typically include acids such as acetic and butyric acids along with compounds such as urea are dissociated in electrolyzer $914b$. Electrolyzer $914b$ provides current at sufficient voltage to produce hydrogen from such compounds and acids and may provide operation as a digester and an electrolyzer, or may be operated within an anaerobic digester (not shown) or may utilize liquors produced by anaerobic digestion in $914b$ as shown. Such operation is particularly useful for converting organic wastes from a community and or industrial park for purposes of supplying the community with fuel and feed stocks for manufacturing carbon enhanced durable goods.

Figure 8B:
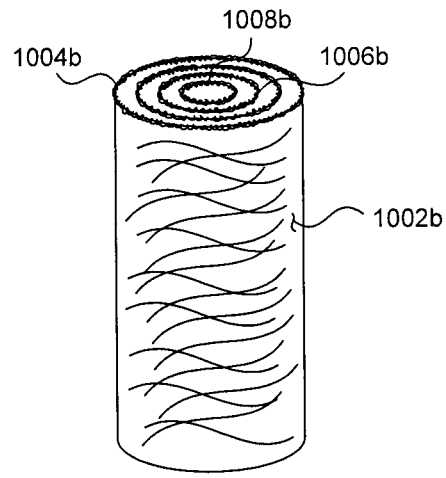
FIG. 8B shows a system for converting organic feedstocks such as those produced by photosynthesis into methane, hydrogen, and or carbon dioxide.

Referring to FIG. 8B, in another aspect an arrangement of one or more electrically conductive electrodes for utilization in an electrolyzer, including those disclosed herein, is shown as including flat sheets (not shown) or concentric electrodes $1002b$, $1003b$, $1004b$, or $1005b$, as shown that may be electrically connected as mono-polar or di-polar components of an electrolyzer. Some or all of such conductive electrodes provide extensive surfaces as high surface to volume materials such as spaced graphene or layers of other thicknesses (e.g., carbon and/or BN "filters"). This serves the purpose of hosting microbes that decompose various organic materials including volatile fatty acids to release electrons and protons for production of hydrogen at cathode surfaces and can be implemented for use with any of the above embodiments.

In another aspect the essential enzymes that microbes produce to decompose volatile fatty acids and various other organic are added to activated carbon or polymer particles or filaments that are incorporated in the high surface to volume materials that comprise electrodes 1002b, 1004b, 1006b, 1008b. Alternatively, any microbe, enzyme or promoter described here can be incorporated into said surface. As such enzymes or other materials or promoters are depleted, degraded, or destroyed supplemental amounts of such enzymes, materials or promoters may be added as needed. This system allows optimization of the prmotoers, including allowing microbes to thrive at a location that is separated but to provide such enzymes to be utilized in the operation of the electrolyzer as shown.

In another embodiment the essential enzymes, microbes or promoters are artificially produced as duplicates or variously altered "designer enzymes" which are grafted to suitable natural polymers such as cellulose or lignocellulose or to various factory produced polymers or compounds.

In maintained enzyme systems that host live colonies of microbes, or enzymes that are transferred from live colonies of microbes, or factory duplicated or variously altered designer enzymes it is desired to minimize the electrical resistance of the electrolyte in the electrolyzer. This facilitates processes such as generally depicted in Equation 9 for acetic acid along with various acids and other substances such as urea that are consumed as hydrogen is produced at the desired elevated pressure, which again, can be implemented in any embodiment disclosed herein.

$$CH3COOH + 2H2O = 2CO2 + 4H2 \qquad \text{Equation 9}$$

In another aspect systems for detection of chemically active substances and identification of the presence, capability, and viability of such substances or enzymes for the purpose of enabling an adaptive control system that adjusts the operating conditions including the amounts of chemically active nutrients and other operating conditions for purposes of optimizing the operation of maintained enzyme systems can be used with the present embodiments. Again, said systems can be implemented with any of the embodiments disclosed herein.

In other embodiments or aspects of any embodiment disclosed herein, it is desirable to operate with selected microbes and/or maintained enzymes at sufficient pressure to increase the amount of $CO_2$ that is dissolved or otherwise retained in solution for the purpose of increasing the conductivity of the electrolyte. This improves the system efficiency and operational capabilities in several ways including:

1) Hydrogen that is produced at elevated pressure can be delivered to compact, pressurized storage without incurring the capital cost, maintenance, or energy expense to operate a multistage hydrogen gas compressor.
2) Hydrogen that is produced at elevated pressure can be directly admitted into a pressurized pipeline for transmission to market.
3) Hydrogen that is produced at elevated pressure can be used to pressurize other reactants to enable or accelerate reactions. Illustratively pressurized hydrogen can be added to nitrogen in a suitable reactor to produce ammonia or other products.
4) Pressurization to prevent or minimize carbon dioxide releases on the electrode surfaces of the electrolyzer greatly simplifies the electrolyzer design.
5) Separation of hydrogen and carbon dioxide production by collection of hydrogen at elevated pressure from the pressurized electrolyzer or a suitable subsystem and collection of carbon dioxide upon depressurization at another location or by another sub-system.

Figure 9B:
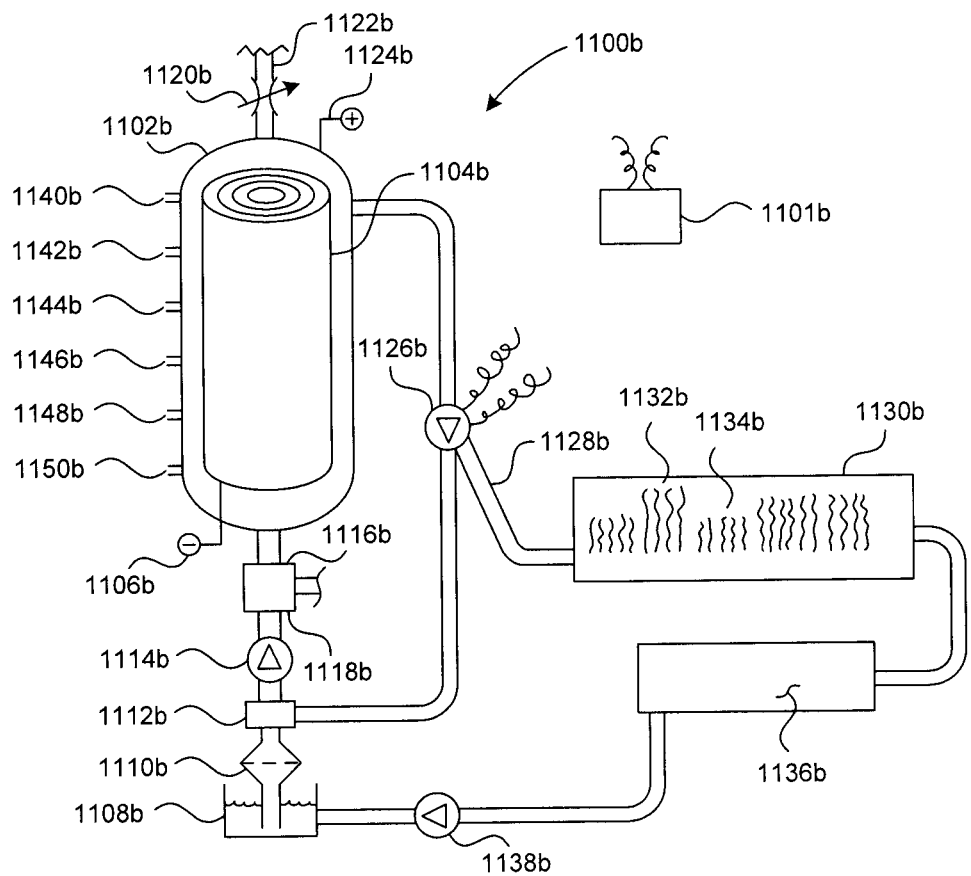
FIG. 9B shows a system for converting organic feedstocks such as those produced by photosynthesis into methane, hydrogen, and or carbon dioxide.

Referring to FIG. 9B, a system 1100b is shown including elevated pressure electrolyzer 1102b, which may receive pressurized electrolyte and/or precursor fluids that form suitable electrolytes within electrolyzer 1102b from suitable pump 1114b. Pressurized hydrogen is produced as a result of the action of microbes and/or otherwise maintained enzymes on one or more electrodes depicted such as 1002b, 1004b, 1006b, 1008b etc., or 1104b along with voltage applied across taps 1106b and 1124b as shown. Elevated pressure hydrogen is delivered to a suitable application through conduit 1122b by pressure regulator 1120b.

Pressurized electrolyte containing carbon dioxide flows through fluid motor-generator 1126b to produce work by harnessing the kinetic energy of the flowing electrolyte and the expansion of carbon dioxide to ambient pressure as it is diverted to a suitable carbon dioxide use such as a hydroponic system or greenhouse 1130b for growing algae switch grass, kudzu or various other crops 1132b and/or 1134b. Electrolyte that has been depleted of carbon dioxide is recycled by pump 1114b through three way valve 1112b.

Biomass including materials grown in 1130b is ground or otherwise made into a slurry of activated substances consisting of broken cellular material that is produced by suitable mechanical, acoustic, chemical, thermal or radiation treatment in processor 1136b. Such activated organic feedstock is added to accumulator 1108b for suitable passage through filter 1110b and passage through three-way valve 1112b to pump 1114b for entry into pressure electrolyzer 1102b as shown.

Operation of system 1100b is provided by controller 1101b in response to pressure, temperature, and pH sensors 1142b, 1144b, 1146b along with chemically active agent sensors 1140b and 1150b as shown. This enables corrective substances to be added through port 1118b for purposes of providing the maintained enzyme conditions desired for optimized performance.

In another embodiment, suitable electrodes include systems that are formed from circular or other cross sections of wire such as square or rectangular or various "star" shapes or flat strip for providing plastically formed woven embodiments or helical embodiments as disclosed herein. Material selections such as iron or other transition metal based alloys are then heat treated to carburize and produce various amounts of carbon in solid solution including saturated zones that are further defined or grown by additional heat treatment to enable growth of such saturated zones particularly near the surface. The carbon zones that develop accelerate the deposition of additional carbon as a carbon donor such as a hydrocarbon or carbon monoxide is decomposed on such surfaces. Equations 10 and 11 show such overall processes of providing heat to the substrate being heat treated in an amount that is equal or greater than the heat of formation of the carbon donor:

$$CxHy + \text{Heat} \rightarrow xC + 0.5yH2 \qquad \text{Equation 10}$$

$$CO + \text{Heat} \rightarrow C + 0.5O2 \qquad \text{Equation 11}$$

In some aspects it is desirable to continue carbon deposition to produce carbon film of effectively coat the entire electrode at sufficient depth with bonding at initial saturation zones to produce a very durable composite of the desired shape and surface to volume ratio.

In another embodiment initial preparation and the orientation of the carbon rich zones that approach saturation conditions are modified by hot or cold working the embodiment to provide sufficiently uniform orientation of the carbon crystalline structure to provide a significantly epitaxially influenced deposit of the subsequent carbon deposition. The oriented carbon thus deposited such as predominantly edge exposed or as graphene layers that are more parallel to the original surface are competitively tested to provide support of the desired microbial processes. This allows "designer carbon" to be selected for each type of microbial process desired.

Figure 10B:
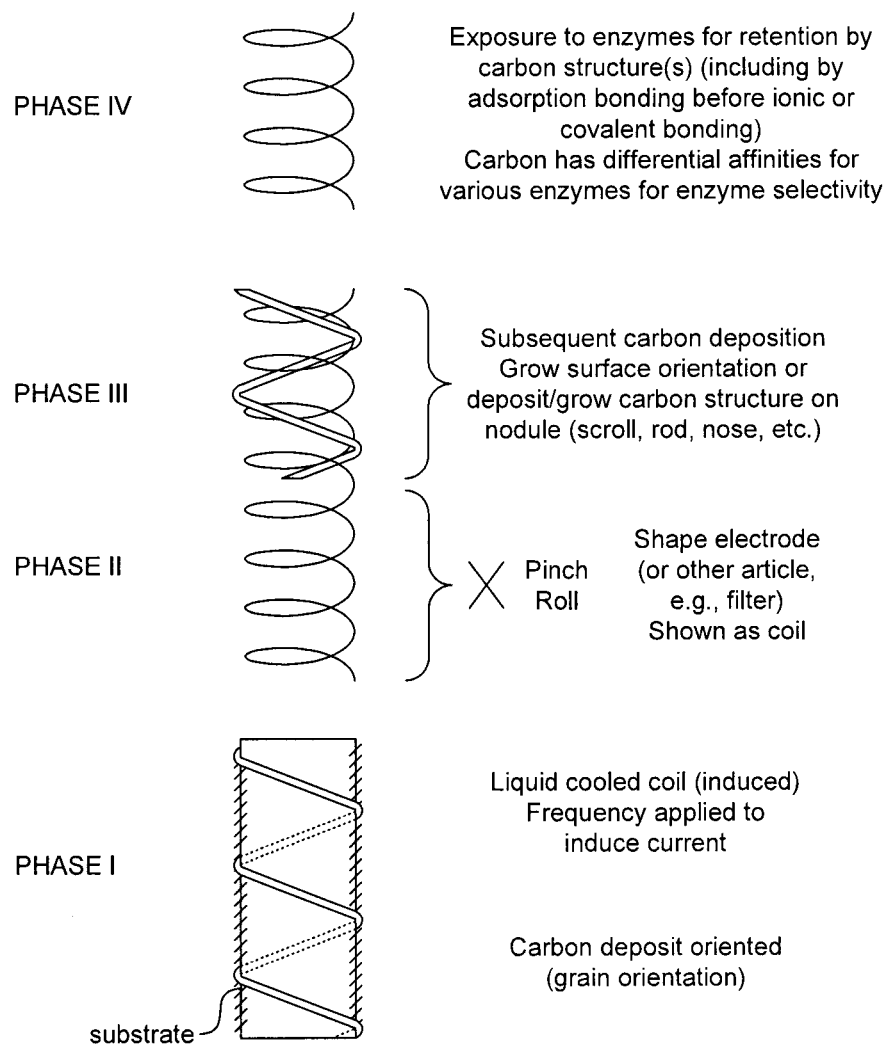
FIG. 10B shows a method for manufacturing an electrode in accordance with an embodiment of the disclosure.

Referring to FIG. 10B, in another aspect, the manufacture of carbon/steel electrodes for use in the embodiments disclosed herein is disclosed. These electrodes can include surface treated carbon for attachment to selective enzymes, microbes or other promoters for improved operation of the electrolyzer. To manufacture electrodes according to this embodiment, a steel or steel alloy substrate is saturated with carbon. The grains of the saturated carbon are aligned by, for example, heat treating through induction to provide a desired grain orientation for the carbon as shown in phase I. Other known heat treating method may be employed. During this step the electrode can also be subjected to liquid cooling to prevent damage to the electrode or provide other benefits.

As shown in phase II, the electrode is then shaped through known processes, including pinch rolling. The shaping can be implemented in a manner to further align, flatten or modify the oriented carbon grains as desired.

As shown in phase III, carbon is then deposited on the electrode through known carbon deposition techniques including vapor deposition, by which the carbon is deposited or grown on the surface of the electrode. During this step the carbon can be deposited or grown in a manner to further enhance the grain orientation or selectively deposit the carbon at selected locations on the electrode depending on the desired use of the electrode. For example, the enzyme, microbe, or promoter can be deposited at one location and another enzyme, microbe or promoter can be deposited at another location for controlled use of the enzyme, microbe and promoter. In addition, the electrode with the deposited carbon can be further treated through heating by induction or other means to further align or orient the grains, and which again can include liquid cooling. This process can be repeated until the desired carbon amount and/or grain orientation and/or grain location is achieved.

As shown in Phase IV, upon completion of the surface treatment, the electrode is then exposed to one or more enzymes, microbes or promoters selected for the particular application of the electrode, for example enzymes that enhance the production of desired compounds during electrolysis such as hydrogen. In any of the above steps the method can target specific locations of the electrode. Moreover, different treatment conditions can be applied to different locations such that different enzymes can be deployed or different enzyme densities can be implemented at different locations depending on the desired configuration or use of the electrode. In this manner an electrode is manufactured to include carbon constructs having an affinity for particular enzymes, microbe or promoters, and to bond the enzymes, microbes or promoters to the electrodes at desired locations to permanently or substantially retain the enzymes at the desired locations for use during electrolysis or other operation of the electrode.

Although the invention has been described with respect to specific embodiments and examples, it will be readily appreciated by those skilled in the art that modifications and adaptations of the invention are possible without deviation from the spirit and scope of the invention. Accordingly, the scope of the present invention is limited only by the following claims.

What is claimed is:

1. A method for providing a renewable source of a material resource comprising:
   providing a first source of renewable energy;
   providing a first stream of materials from a first materials source;
   providing an electrolyzer configured for reversible operation coupled to the first stream of materials and the first source of renewable energy, wherein the electrolyzer produces a material resource from the first stream of materials through electrolysis,
   providing the material resource to a first processor for further processing or use, wherein the step of providing the first material resource to the first processor for further processing or use comprises disassociating the material resource into pressurized hydrogen and elemental carbon wherein the elemental carbon is used to create a durable good.

2. The method of claim 1 wherein the material resource comprises hydrogen.

3. The method of claim 1 wherein the material resource comprises a carbon-based material.

4. The method of claim 1 wherein the material resource comprises a hydrocarbon.

5. The method of claim 1 wherein the material resource comprises a nitrogen-based material.

6. The method of claim 1 wherein the first materials source is selected from group comprising organic materials, biomass, and biowaste.

7. The method of claim 1 further comprising the step of further processing the material resource by adding heat to the material resource from the first processor.

8. The method of claim 7 wherein the first processor comprises a solar collector.

9. The method of claim 8 wherein the solar collector is coupled to the electrolyzer.

10. The method of claim 9 wherein the solar collector comprises a solar concentration mirror.

11. The method of claim 10 wherein the solar concentration mirror comprises parabolic, spherical, or arrayed heliostatic mirrors.

12. The method of claim 8 further comprising a first supplemental heat source to supplement or replace the heat from the solar collector.

13. The method of claim 11 wherein the material resource comprises methane and the step of further processing the material resource comprises disassociating the methane to produce carbon and hydrogen.

14. The method of claim 1 wherein the material resource further comprises carbon dioxide.

15. The method of claim 1 further comprising the step of converting the hydrogen into energy.

16. The method of claim 1 wherein the electrolyzer is configured for selectably reversible operation as a fuel cell and the step of converting the hydrogen into energy comprises operation of the electrolyzer as a fuel cell.

17. The method of claim 1 further comprising the step of converting the carbon into one or more durable goods.

18. The method of claim 17 wherein the one or more durable goods comprises one or more durable goods for use in the step of providing the first source of renewable energy.

19. The method of claim 14 further comprising the step of providing the carbon dioxide for agricultural use.

\* \* \* \* \*

UNITED STATES PATENT AND TRADEMARK OFFICE
CERTIFICATE OF CORRECTION

PATENT NO. : 8,808,529 B2  
APPLICATION NO. : 12/857554  
DATED : August 19, 2014  
INVENTOR(S) : Roy E. McAlister Page 1 of 2

It is certified that error appears in the above-identified patent and that said Letters Patent is hereby corrected as shown below:

Title Page, Item (63), in column 1, in "Related U.S. Application Data", line 2, delete "which" and insert -- and --, therefor.

Title Page, Item (63), in column 1, in "Related U.S. Application Data", line 4, delete "which" and insert -- and --, therefor.

On the Title Page 3, in column 1, under "Other Publications", line 7, delete "Billlion" and insert -- Billion --, therefor.

On the Title Page 3, in column 2, under "Other Publications", line 18, delete "Hyway" and insert -- Highway --, therefor.

In the Specification

In column 2, line 30, delete "Desulfovibro" and insert -- Desulfovibrio --, therefor.

In column 2, line 31, delete "Methanocarcina" and insert -- Methanosarcina --, therefor.

In column 4, line 34, delete "and or" and insert -- and/or --, therefor.

In column 4, line 37, delete "and or" and insert -- and/or --, therefor.

In column 4, line 40, delete "and or" and insert -- and/or --, therefor.

In column 5, line 37, delete "and or" and insert -- and/or --, therefor.

In column 10, line 25, delete "lingocellulosic" and insert -- lignocellulosic --, therefor.

In column 13, line 6, delete "and or" and insert -- and/or --, therefor.

In column 13, line 61, delete "744" and insert -- 744, --, therefor.

In column 17, line 24, after "zone" insert -- 930 --.

In column 17, line 56, delete "turpenes" and insert -- terpenes --, therefor.

In column 18, line 40, delete "turpenes," and insert -- terpenes, --, therefor.

In column 19, line 27, delete "on" and insert -- so --, therefor.

Signed and Sealed this  
Third Day of February, 2015

Michelle K. Lee  
*Deputy Director of the United States Patent and Trademark Office*

In column 25, line 2, delete "chlorotrifluro" and insert -- chlorotrifluoro --, therefor.

In column 25, line 25, Equation 1, delete "formers,Facultative" and insert -- formers, Facultative --, therefor.

In column 31, line 47, delete "and or" and insert -- and/or --, therefor.

In column 32, line 1, delete "and or" and insert -- and/or --, therefor.

In column 32, line 40, delete "and or" and insert -- and/or --, therefor.

In column 32, line 46, delete "and or" and insert -- and/or --, therefor.

In column 32, line 54, delete "and or" and insert -- and/or --, therefor.

In column 33, lines 1-2, delete "tetramethoxyphenylporphirine" and insert

-- tetramethoxyphenylporphyrin --, therefor.

In column 33, line 3, delete "and or" and insert -- and/or --, therefor.

In column 33, line 15, delete "and or" and insert -- and/or --, therefor.

In column 33, line 21, delete "and or" and insert -- and/or --, therefor.

In column 33, line 52, delete "and or" and insert -- and/or --, therefor.

In column 33, line 58, delete "and or" and insert -- and/or --, therefor.

In column 33, line 61, delete "and or" and insert -- and/or --, therefor.

In column 33, line 63, delete "and or" and insert -- and/or --, therefor.

In column 33, line 63, delete "and or" and insert -- and/or --, therefor.

In column 33, line 65, delete "and or" and insert -- and/or --, therefor.

In column 34, line 23, delete "and or" and insert -- and/or --, therefor.

In column 34, line 32, delete "and or" and insert -- and/or --, therefor.

In column 34, line 37, delete "and or" and insert -- and/or --, therefor.

In column 34, line 47, delete "and or" and insert -- and/or --, therefor.

In column 34, line 65, delete "and or" and insert -- and/or --, therefor.

In column 35, lines 5-6, delete "and or" and insert -- and/or --, therefor.

In column 36, line 7, delete "and or" and insert -- and/or --, therefor.

In column 36, line 9, delete "and or" and insert -- and/or --, therefor.

In column 36, line 23, delete "and or" and insert -- and/or --, therefor.

In column 36, line 53, delete "and or" and insert -- and/or --, therefor.

In column 37, line 13, delete "prmotoers," and insert -- promoters, --, therefor.

In the Claims

In column 40, line 48, in claim 13, delete "disassociating" and insert -- disassociated --, therefor.